United States Patent
Chen

(10) Patent No.: US 9,933,578 B1
(45) Date of Patent: Apr. 3, 2018

(54) MULTI-LAYER MONOLITHIC FIBER OPTIC ALIGNMENT STRUCTURES, METHODS FOR MAKING, AND METHODS FOR USING

(71) Applicant: Microfabrica Inc., Van Nuys, CA (US)

(72) Inventor: Richard T. Chen, Woodland Hills, CA (US)

(73) Assignee: Microfabrica Inc., Van Nuys, CA (US)

( * ) Notice: Subject to any disclaimer, the term of this patent is extended or adjusted under 35 U.S.C. 154(b) by 0 days.

(21) Appl. No.: 15/180,017

(22) Filed: Jun. 11, 2016

Related U.S. Application Data

(60) Provisional application No. 62/174,265, filed on Jun. 11, 2015.

(51) Int. Cl.
*G02B 6/00* (2006.01)
*G02B 6/36* (2006.01)

(52) U.S. Cl.
CPC ......... *G02B 6/3652* (2013.01); *G02B 6/3644* (2013.01); *G02B 6/3684* (2013.01)

(58) Field of Classification Search
CPC ...... G02B 6/3636; G02B 6/3652; G02B 6/00; G02B 6/4452; G02B 6/3897
See application file for complete search history.

(56) References Cited

U.S. PATENT DOCUMENTS

| | | | |
|---|---|---|---|
| 5,150,440 A * | 9/1992 | Booth | G02B 6/13 385/49 |
| 5,190,637 A | 3/1993 | Guckel | |
| 5,659,647 A | 8/1997 | Kravitz et al. | |
| 5,737,346 A | 4/1998 | Stenstrom | |
| 6,027,630 A | 2/2000 | Cohen | |
| 6,281,445 B1 * | 8/2001 | Yokoyama | H01L 23/49811 174/250 |
| 7,811,427 B2 | 10/2010 | Cohen et al. | |
| 2002/0110957 A1 | 8/2002 | King et al. | |

FOREIGN PATENT DOCUMENTS

WO    WO0137005 A2    5/2001

OTHER PUBLICATIONS

Cohen, et al., "EFAB: Batch Production of Functional, Fully-Dense Metal Parts with Micron-Scale Features", Proc. 9th Solid Freeform Fabrication, The University of Texas at Austin, Aug. 1998, pp. 161-168.
Adam L. Cohen, et al., "EFAB: Rapid, Low-Cost Desktop Micromachining of High Aspect Ratio True 3-D MEMS", Proc. 12th IEEE Micro Electro Mechanical Systems Workshop, IEEE, Jan. 17-21, 1999, pp. 244-251.
"Microfabrication—Rapid Prototyping's Killer Application", Rapid Prototyping Report, CAD/CAM Publishing, Inc., Jun. 1999, pp. 1-5.
Adam L. Cohen, "3-D Micromachining by Electrochemical Fabrication", Micromachine Devices, Mar. 1999, pp. 6-7.

(Continued)

*Primary Examiner* — Jennifer Doan
(74) *Attorney, Agent, or Firm* — Dennis R. Smalley

(57) ABSTRACT

Embodiments of the present invention are directed to fiber optic element devices, methods for aligning fiber optic elements, and batch formation methods for creating such fiber optic alignment devices.

19 Claims, 11 Drawing Sheets

(56) References Cited

OTHER PUBLICATIONS

Gang Zhang, et al., "EFAB: Rapid Desktop Manufacturing of True 3-D Microstructures", Proc. 2nd International Conference on Integrated MicroNanotechnology for Space Applications, The Aerospace Co., Apr. 1999.

F. Tseng, et al., "EFAB: High Aspect Ratio, Arbitrary 3-D Metal Microstructures Using a Low-Cost Automated Batch Process", 3rd International Workshop on High Aspect Ratio Microstructure Technology (HARMST'99), Jun. 1999.

Adam L. Cohen, et al., "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, Sep. 1999.

F. Tseng, et al., "EFAB: High Aspect Ratio, Arbitrary 3-D Metal Microstructures Using a Low-Cost Automated Batch Process", MEMS Symposium, ASME 1999 International Mechanical Engineering Congress and Exposition, Nov. 1999, pp. 55-60.

Adam L. Cohen, "Electrochemical Fabrication (EFABTM)", Chapter 19 of the MEMS Handbook, edited by Mohamed Gad-El-Hak, CRC Press, 2002, pp. 19/1-19/23.

Kravitz, et al., "A Passive Micromachines Device for Alignment of Arrays of Single-mode Fibers for Manufacturable Photonic Packaging", Lasers and Electro-optics Society Annual Meeting, IEEE Oct. 31, 1994, vol. 1, pp. 226-227.

\* cited by examiner

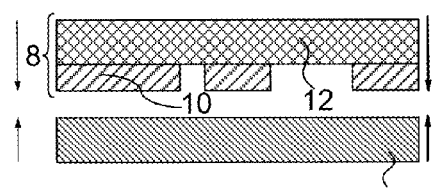
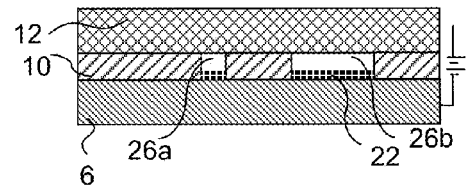
FIG. 1A
(PRIOR ART)
FIG. 1B
(PRIOR ART)
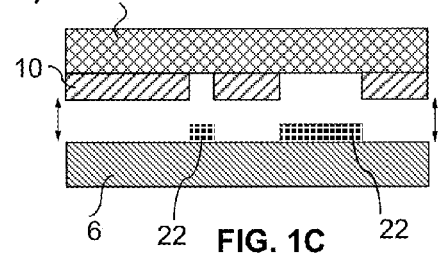
FIG. 1C
(PRIOR ART)
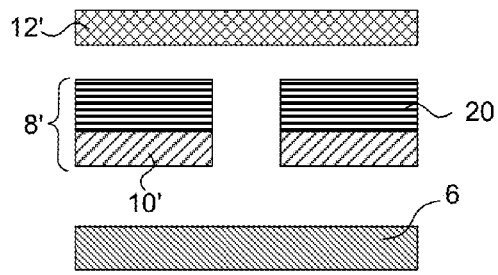
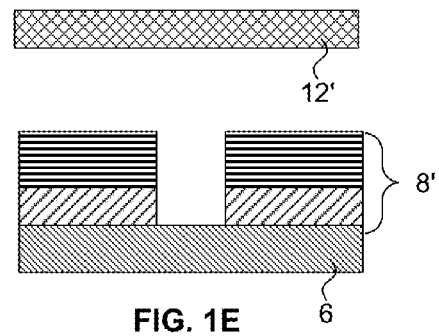
FIG. 1D
(PRIOR ART)
FIG. 1E
(PRIOR ART)
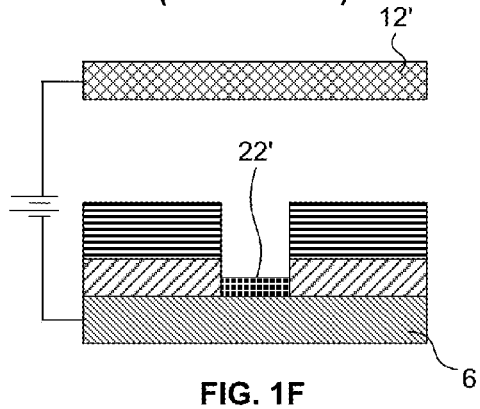
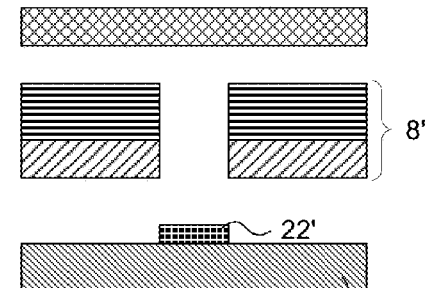
FIG. 1F
(PRIOR ART)
FIG. 1G
(PRIOR ART)

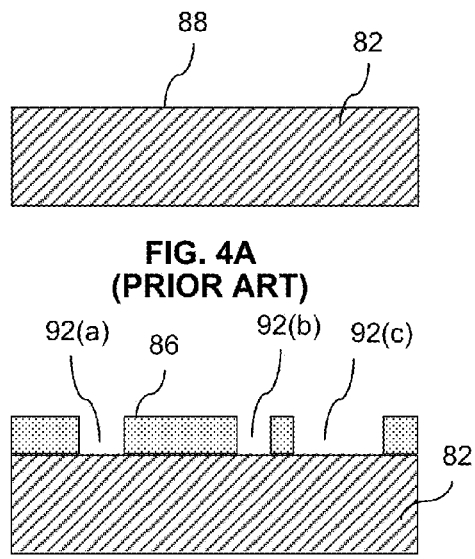
FIG. 4A
(PRIOR ART)
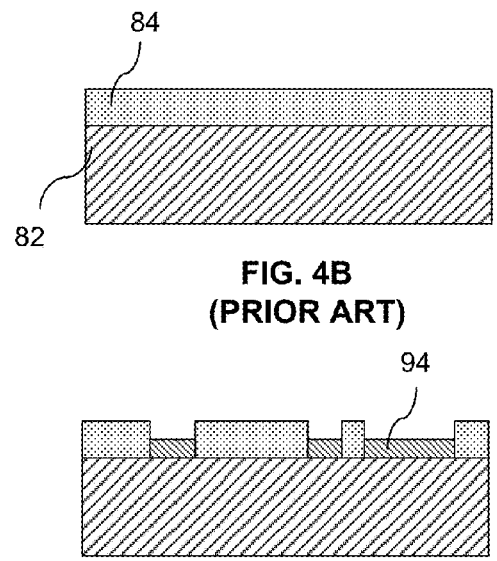
FIG. 4B
(PRIOR ART)
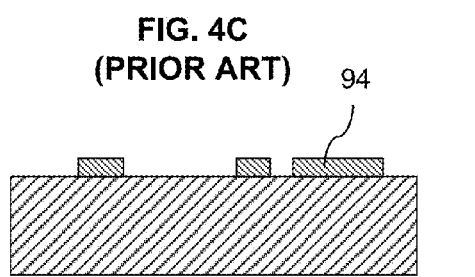
FIG. 4C
(PRIOR ART)
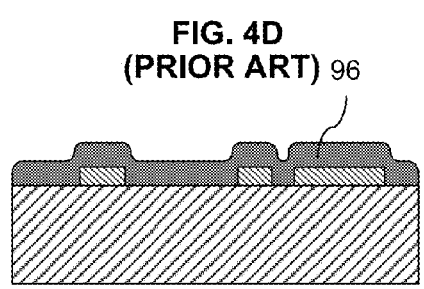
FIG. 4D
(PRIOR ART)
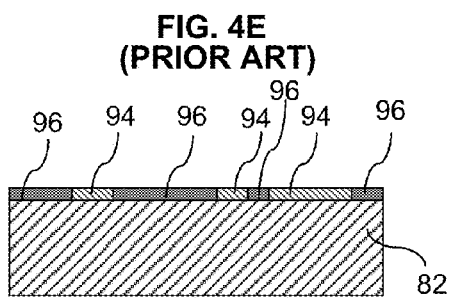
FIG. 4E
(PRIOR ART)
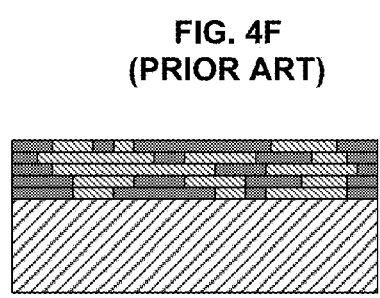
FIG. 4F
(PRIOR ART)
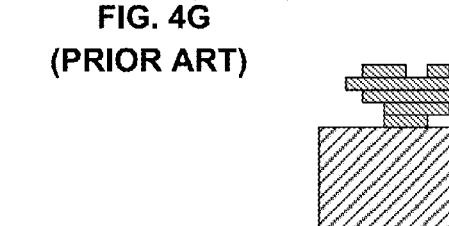
FIG. 4G
(PRIOR ART)
FIG. 4H
(PRIOR ART)
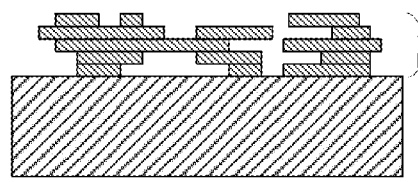
FIG. 4I
(PRIOR ART)

US 9,933,578 B1

MULTI-LAYER MONOLITHIC FIBER OPTIC ALIGNMENT STRUCTURES, METHODS FOR MAKING, AND METHODS FOR USING

RELATED APPLICATIONS

This application claims the benefit of U.S. Provisional Patent Application No. 62/174,265, filed Jun. 11, 2015. This application is incorporated herein by reference as if set forth in full herein.

FIELD OF THE INVENTION

The present invention relates generally to the field of fiber optics and more particularly to the field of fiber optic alignment devices and even more particularly to the field of passive fiber optic alignment devices while some embodiments relate to methods for making such devices, or methods for using such devices.

BACKGROUND OF THE INVENTION

Electrochemical Fabrication:

An electrochemical fabrication technique for forming three-dimensional structures from a plurality of adhered layers has been and is being commercially pursued by Microfabrica® Inc. (formerly MEMGen Corporation) of Van Nuys, Calif. under the process names EFAB™ and MICA FREEFORM®.

Various electrochemical fabrication techniques were described in U.S. Pat. No. 6,027,630, issued on Feb. 22, 2000 to Adam Cohen. Some embodiments of this electrochemical fabrication technique allows the selective deposition of a material using a mask that includes a patterned conformable material on a support structure that is independent of the substrate onto which plating will occur. When desiring to perform an electrodeposition using the mask, the conformable portion of the mask is brought into contact with a substrate, but not adhered or bonded to the substrate, while in the presence of a plating solution such that the contact of the conformable portion of the mask to the substrate inhibits deposition at selected locations. For convenience, these masks might be generically called conformable contact masks; the masking technique may be generically called a conformable contact mask plating process. More specifically, in the terminology of Microfabrica Inc. such masks have come to be known as INSTANT MASKS™ and the process known as INSTANT MASKING™ or INSTANT MASK™ plating. Selective depositions using conformable contact mask plating may be used to form single selective deposits of material or may be used in a process to form multi-layer structures. The teachings of the '630 patent are hereby incorporated herein by reference as if set forth in full herein. Since the filing of the patent application that led to the above noted patent, various papers about conformable contact mask plating (i.e. INSTANT MASKING) and electrochemical fabrication have been published:

(1) A. Cohen, G. Zhang, F. Tseng, F. Mansfeld, U. Frodis and P. Will, "EFAB: Batch production of functional, fully-dense metal parts with micro-scale features", Proc. 9th Solid Freeform Fabrication, The University of Texas at Austin, p 161, August 1998.

(2) A. Cohen, G. Zhang, F. Tseng, F. Mansfeld, U. Frodis and P. Will, "EFAB: Rapid, Low-Cost Desktop Micromachining of High Aspect Ratio True 3-D MEMS", Proc. 12th IEEE Micro Electro Mechanical Systems Workshop, IEEE, p 244, January 1999.

(3) A. Cohen, "3-D Micromachining by Electrochemical Fabrication", Micromachine Devices, March 1999.

(4) G. Zhang, A. Cohen, U. Frodis, F. Tseng, F. Mansfeld, and P. Will, "EFAB: Rapid Desktop Manufacturing of True 3-D Microstructures", Proc. 2nd International Conference on Integrated MicroNanotechnology for Space Applications, The Aerospace Co., April 1999.

(5) F. Tseng, U. Frodis, G. Zhang, A. Cohen, F. Mansfeld, and P. Will, "EFAB: High Aspect Ratio, Arbitrary 3-D Metal Microstructures using a Low-Cost Automated Batch Process", 3rd International Workshop on High Aspect Ratio MicroStructure Technology (HARMST '99), June 1999.

(6) A. Cohen, U. Frodis, F. Tseng, G. Zhang, F. Mansfeld, and P. Will, "EFAB: Low-Cost, Automated Electrochemical Batch Fabrication of Arbitrary 3-D Microstructures", Micromachining and Microfabrication Process Technology, SPIE 1999 Symposium on Micromachining and Microfabrication, September 1999.

(7) F. Tseng, G. Zhang, U. Frodis, A. Cohen, F. Mansfeld, and P. Will, "EFAB: High Aspect Ratio, Arbitrary 3-D Metal Microstructures using a Low-Cost Automated Batch Process", MEMS Symposium, ASME 1999 International Mechanical Engineering Congress and Exposition, November, 1999.

(8) A. Cohen, "Electrochemical Fabrication (EFAB™)", Chapter 19 of The MEMS Handbook, edited by Mohamed Gad-El-Hak, CRC Press, 2002.

(9) Microfabrication—Rapid Prototyping's Killer Application", pages 1-5 of the Rapid Prototyping Report, CAD/CAM Publishing, Inc., June 1999.

The disclosures of these nine publications are hereby incorporated herein by reference as if set forth in full herein.

An electrochemical deposition process for forming multilayer structures may be carried out in a number of different ways as set forth in the above patent and publications. In one form, this process involves the execution of three separate operations during the formation of each layer of the structure that is to be formed:

1. Selectively depositing at least one material by electrodeposition upon one or more desired regions of a substrate. Typically this material is either a structural material or a sacrificial material.

2. Then blanket depositing at least one additional material by electrodeposition so that the additional deposit covers both the regions that were previously selectively deposited onto, and the regions of the substrate that did not receive any previously applied selective depositions. Typically this material is the other of a structural material or a sacrificial material.

3. Finally planarizing the materials deposited during the first and second operations to produce a smoothed surface of a first layer of desired thickness having at least one region containing the at least one material and at least one region containing at least the one additional material.

After formation of the first layer, one or more additional layers may be formed adjacent to an immediately preceding layer and adhered to the smoothed surface of that preceding layer. These additional layers are formed by repeating the first through third operations one or more times wherein the formation of each subsequent layer treats the previously formed layers and the initial substrate as a new and thickening substrate.

Once the formation of all layers has been completed, at least a portion of at least one of the materials deposited is generally removed by an etching process to expose or release the three-dimensional structure that was intended to be formed. The removed material is a sacrificial material while the material that forms part of the desired structure is a structural material.

One method of performing the selective electrodeposition involved in the first operation is by conformable contact mask plating. In this type of plating, one or more conformable contact (CC) masks are first formed. The CC masks include a support structure onto which a patterned conformable dielectric material is adhered or formed. The conformable material for each mask is shaped in accordance with a particular cross-section of material to be plated (the pattern of conformable material is complementary to the pattern of material to be deposited). In such a process at least one CC mask is used for each unique cross-sectional pattern that is to be plated.

The support for a CC mask may be a plate-like structure formed of a metal that is to be selectively electroplated and from which material to be plated will be dissolved. In this typical approach, the support will act as an anode in an electroplating process. In an alternative approach, the support may instead be a porous or otherwise perforated material through which deposition material will pass during an electroplating operation on its way from a distal anode to a deposition surface. In either approach, it is possible for multiple CC masks to share a common support, i.e. the patterns of conformable dielectric material for plating multiple layers of material may be located in different areas of a single support structure. When a single support structure contains multiple plating patterns, the entire structure is referred to as the CC mask while the individual plating masks may be referred to as "submasks". In the present application such a distinction will be made only when relevant to a specific point being made.

In some implementations, a single structure, part or device may be formed during execution of the above noted steps or in other implementations (batch processes) multiple identical or different structures, parts, or devices, may be built up simultaneously.

In preparation for performing the selective deposition of the first operation, the conformable portion of the CC mask is placed in registration with and pressed against a selected portion of (1) the substrate, (2) a previously formed layer, or (3) a previously deposited material forming a portion of the given layer that is being created. The pressing together of the CC mask and relevant substrate, layer, or material occurs in such a way that all openings, in the conformable portions of the CC mask contain plating solution. The conformable material of the CC mask that contacts the substrate, layer, or material acts as a barrier to electrodeposition while the openings in the CC mask that are filled with electroplating solution act as pathways for transferring material from an anode (e.g. the CC mask support) to the non-contacted portions of the substrate (which act as a cathode during the plating operation) when an appropriate potential and/or current are supplied.

An example of a CC mask and CC mask plating are shown in FIGS. 1A-1O. FIG. 1A shows a side view of a CC mask 8 consisting of a conformable or deformable (e.g. elastomeric) insulator 10 patterned on an anode 12. The anode has two functions. One is as a supporting material for the patterned insulator 10 to maintain its integrity and alignment since the pattern may be topologically complex (e.g., involving isolated "islands" of insulator material). The other function is as an anode for the electroplating operation. FIG. 1A also depicts a substrate 6, separated from mask 8, onto which material will be deposited during the process of forming a layer. CC mask plating selectively deposits material 22 onto substrate 6 by simply pressing the insulator against the substrate then electrodepositing material through apertures 26a and 26b in the insulator as shown in FIG. 1B. After deposition, the CC mask is separated, preferably non-destructively, from the substrate 6 as shown in FIG. 1O.

The CC mask plating process is distinct from a "through-mask" plating process in that in a through-mask plating process the separation of the masking material from the substrate would occur destructively. Furthermore in a through mask plating process, openings in the masking material are typically formed while the masking material is in contact with and adhered to the substrate. As with through-mask plating, CC mask plating deposits material selectively and simultaneously over the entire layer. The plated region may consist of one or more isolated plating regions where these isolated plating regions may belong to a single structure that is being formed or may belong to multiple structures that are being formed simultaneously. In CC mask plating as individual masks are not intentionally destroyed in the removal process, they may be usable in multiple plating operations.

Another example of a CC mask and CC mask plating is shown in FIGS. 1D-1G. FIG. 1D shows an anode 12' separated from a mask 8' that includes a patterned conformable material 10' and a support structure 20. FIG. 1D also depicts substrate 6 separated from the mask 8'. FIG. 1E illustrates the mask 8' being brought into contact with the substrate 6. FIG. 1F illustrates the deposit 22' that results from conducting a current from the anode 12' to the substrate 6. FIG. 1G illustrates the deposit 22' on substrate 6 after separation from mask 8'. In this example, an appropriate electrolyte is located between the substrate 6 and the anode 12' and a current of ions coming from one or both of the solution and the anode are conducted through the opening in the mask to the substrate where material is deposited. This type of mask may be referred to as an anodeless INSTANT MASK™ (AIM) or as an anodeless conformable contact (ACC) mask.

Unlike through-mask plating, CC mask plating allows CC masks to be formed completely separate from the substrate on which plating is to occur (e.g. separate from a three-dimensional (3D) structure that is being formed). CC masks may be formed in a variety of ways, for example, using a photolithographic process. All masks can be generated simultaneously, e.g. prior to structure fabrication rather than during it. This separation makes possible a simple, low-cost, automated, self-contained, and internally-clean "desktop factory" that can be installed almost anywhere to fabricate 3D structures, leaving any required clean room processes, such as photolithography to be performed by service bureaus or the like.

An example of the electrochemical fabrication process discussed above is illustrated in FIGS. 2A-2F. These figures show that the process involves deposition of a first material 2 which is a sacrificial material and a second material 4 which is a structural material. The CC mask 8, in this example, includes a patterned conformable material (e.g. an elastomeric dielectric material) 10 and a support 12 which is made from deposition material 2. The conformal portion of the CC mask is pressed against substrate 6 with a plating solution 14 located within the openings 16 in the conformable material 10. An electric current, from power supply 18, is then passed through the plating solution 14 via (a) support 12 which doubles as an anode and (b) substrate 6 which doubles as a cathode. FIG. 2A illustrates that the passing of current causes material 2 within the plating solution and material 2 from the anode 12 to be selectively transferred to and plated on the substrate 6. After electroplating the first deposition material 2 onto the substrate 6 using CC mask 8, the CC mask 8 is removed as shown in FIG. 2B. FIG. 2C depicts the second deposition material 4 as having been blanket-deposited (i.e. non-selectively deposited) over the previously deposited first deposition material 2 as well as over the other portions of the substrate 6. The blanket deposition occurs by electroplating from an anode (not shown), composed of the second material, through an appropriate plating solution (not shown), and to the cathode/substrate 6. The entire two-material layer is then planarized to achieve precise thickness and flatness as shown in FIG. 2D. After repetition of this process for all layers, the multi-layer structure 20 formed of the second material 4 (i.e. structural material) is embedded in first material 2 (i.e. sacrificial material) as shown in FIG. 2E. The embedded structure is etched to yield the desired device, i.e. structure 20, as shown in FIG. 2F.

Various components of an exemplary manual electrochemical fabrication system 32 are shown in FIGS. 3A-3C. The system 32 consists of several subsystems 34, 36, 38, and 40. The substrate holding subsystem 34 is depicted in the upper portions of each of FIGS. 3A-3C and includes several components: (1) a carrier 48, (2) a metal substrate 6 onto which the layers are deposited, and (3) a linear slide 42 capable of moving the substrate 6 up and down relative to the carrier 48 in response to drive force from actuator 44. Subsystem 34 also includes an indicator 46 for measuring differences in vertical position of the substrate which may be used in setting or determining layer thicknesses and/or deposition thicknesses. The subsystem 34 further includes feet 68 for carrier 48 which can be precisely mounted on subsystem 36.

The CC mask subsystem 36 shown in the lower portion of FIG. 3A includes several components: (1) a CC mask 8 that is actually made up of a number of CC masks (i.e. submasks) that share a common support/anode 12, (2) precision X-stage 54, (3) precision Y-stage 56, (4) frame 72 on which the feet 68 of subsystem 34 can mount, and (5) a tank 58 for containing the electrolyte 16. Subsystems 34 and 36 also include appropriate electrical connections (not shown) for connecting to an appropriate power source (not shown) for driving the CC masking process.

The blanket deposition subsystem 38 is shown in the lower portion of FIG. 3B and includes several components: (1) an anode 62, (2) an electrolyte tank 64 for holding plating solution 66, and (3) frame 74 on which feet 68 of subsystem 34 may sit. Subsystem 38 also includes appropriate electrical connections (not shown) for connecting the anode to an appropriate power supply (not shown) for driving the blanket deposition process.

The planarization subsystem 40 is shown in the lower portion of FIG. 3C and includes a lapping plate 52 and associated motion and control systems (not shown) for planarizing the depositions.

In addition to teaching the use of CC masks for electrodeposition purposes, the '630 patent also teaches that the CC masks may be placed against a substrate with the polarity of the voltage reversed and material may thereby be selectively removed from the substrate. It indicates that such removal processes can be used to selectively etch, engrave, and polish a substrate, e.g., a plaque.

The '630 patent further indicates that the electroplating methods and articles disclosed therein allow fabrication of devices from thin layers of materials such as, e.g., metals, polymers, ceramics, and semiconductor materials. It further indicates that although the electroplating embodiments described therein have been described with respect to the use of two metals, a variety of materials, e.g., polymers, ceramics and semiconductor materials, and any number of metals can be deposited either by the electroplating methods therein, or in separate processes that occur throughout the electroplating method. It indicates that a thin plating base can be deposited, e.g., by sputtering, over a deposit that is insufficiently conductive (e.g., an insulating layer) so as to enable subsequent electroplating. It also indicates that multiple support materials (i.e. sacrificial materials) can be included in the electroplated element allowing selective removal of the support materials.

The '630 patent additionally teaches that the electroplating methods disclosed therein can be used to manufacture elements having complex microstructure and close tolerances between parts. An example is given with the aid of FIGS. 14A-14E of that patent. In the example, elements having parts that fit with close tolerances, e.g., having gaps between about 1-5 um, including electroplating the parts of the device in an unassembled, preferably pre-aligned state. In such embodiments, the individual parts can be moved into operational relation with each other or they can simply fall together. Once together the separate parts may be retained by clips or the like.

Another method for forming microstructures from electroplated metals (i.e. using electrochemical fabrication techniques) is taught in U.S. Pat. No. 5,190,637 to Henry Guckel, entitled "Formation of Microstructures by Multiple Level Deep X-ray Lithography with Sacrificial Metal layers". This patent teaches the formation of metal structure utilizing through mask exposures. A first layer of a primary metal is electroplated onto an exposed plating base to fill a void in a photoresist (the photoresist forming a through mask having a desired pattern of openings), the photoresist is then removed and a secondary metal is electroplated over the first layer and over the plating base. The exposed surface of the secondary metal is then machined down to a height which exposes the first metal to produce a flat uniform surface extending across both the primary and secondary metals. Formation of a second layer may then begin by applying a photoresist over the first layer and patterning it (i.e. to form a second through mask) and then repeating the process that was used to produce the first layer to produce a second layer of desired configuration. The process is repeated until the entire structure is formed and the secondary metal is removed by etching. The photoresist is formed over the plating base or previous layer by casting and patterning of the photoresist (i.e. voids formed in the photoresist) are formed by exposure of the photoresist through a patterned mask via X-rays or UV radiation and development of the exposed or unexposed areas.

The '637 patent teaches the locating of a plating base onto a substrate in preparation for electroplating materials onto the substrate. The plating base is indicated as typically involving the use of a sputtered film of an adhesive metal, such as chromium or titanium, and then a sputtered film of the metal that is to be plated. It is also taught that the plating base may be applied over an initial layer of sacrificial material (i.e. a layer or coating of a single material) on the substrate so that the structure and substrate may be detached if desired. In such cases after formation of the structure the sacrificial material forming part of each layer of the structure may be removed along with the initial sacrificial layer to free the structure. Substrate materials mentioned in the '637 patent include silicon, glass, metals, and silicon with protected semiconductor devices. A specific example of a plating base includes about 150 angstroms of titanium and about 300 angstroms of nickel, both of which are sputtered at a temperature of 160° C. In another example, it is indicated that the plating base may consist of 150 angstroms of titanium and 150 angstroms of nickel where both are applied by sputtering.

A need exists in various fields for miniature devices having improved characteristics, reduced fabrication times, reduced fabrication costs, simplified fabrication processes, greater versatility in device design, improved selection of materials, improved material properties, more cost effective and less risky production of such devices, and/or more independence between geometric configuration and the selected fabrication process. In particular in the field of fiber optics a need exists for improved devices that provide alignment of fiber optic elements or fibers.

SUMMARY OF THE INVENTION

It is an object of some embodiments of the invention to provide improved fiber optic alignment devices for side to side alignment of multiple fibers.

It is an object of some embodiments of the invention to provide improved fiber optic alignment devices for end to end alignment of pairs of fibers or groups of pairs of fibers.

It is an object of some embodiments of the invention to provide improved fiber optic alignment devices in two axes that are perpendicular to a longitudinal axis of the fiber or fibers.

It is an object of some embodiments of the invention to provide improved fiber optic alignment devices that provide improved positioning of a fiber optic element along its longitudinal dimension relative to a mating component or a second fiber optic element.

It is an object of some embodiments of the invention to provide improved fiber optic alignment devices that provide improved orientation of a fiber optic element along its longitudinal dimension relative to a mating component or a second fiber optic element.

It is an object of some embodiments of the invention to provide an improved method for positioning of a fiber optic element along its longitudinal dimension relative to a mating component or a second fiber optic element.

It is an object of some embodiments of the invention to provide a method that provides for improved orientation of a fiber optic element along its longitudinal dimension relative to a mating component or a second fiber optic element.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects.

In a first aspect of the invention a fiber optic alignment device including a plurality of layers of a material includes: (i) at least one fiber optic element entry port defined by at least a portion of the plurality of layers; (ii) at least one fiber optic element insertion channel extending from the at least one fiber optic entry port through at least a portion of the plurality of layers; (iii) a first side alignment feature, for each insertion channel, running at least part way along a side of the insertion channel; (iv) an alignment surface, for each insertion channel, selected from the group consisting of a top alignment surface and a bottom alignment surface defining a respective top or bottom of the insertion channel; and (v) at least one spring element, for each insertion channel, that forces an inserted fiber optic element into an alignment position.

Numerous variations of the first aspect of the invention are possible and include for example, one or more of: (1) the spring element force biasing an inserted fiber optic element into a position against the first side alignment feature and the alignment surface; (2) the spring element force having a component along a stacking direction of the layers and along a direction that perpendicular to the plane of the layers; (3) the spring element force being directed perpendicular to a plane of the layers without a substantial component parallel to the plane of the layers (e.g. less than 10% of the perpendicular component, more preferably less than 5% of the perpendicular component, and most preferably less than 1% of the perpendicular component); (4) the spring element force being directed parallel to a plane of the layers without a substantial component perpendicular to the plane of the layers (e.g. less than 10% of the parallel component, more preferably less than 5% of the parallel component, and most preferably less than 1% of the parallel component); (5) the at least one entry port comprises a plurality of entry ports for receiving a plurality of fiber optic elements; (6) the at least one spring alignment element includes a plurality of spring alignment elements are configured to act on a fiber optic element when inserted into a given insertion channel; (7) the variation of (6) wherein the plurality of springs comprises multiple springs located in series along the given insertion channel; (8) the first side alignment feature for at least one channel is defined by a configuration of a single one of the plurality of layers; (9) the at least one spring element is selected from the group consisting of (a) a single cantilever for a given channel, (b) multiple cantilevers for a given channel, (c) at least one compliant bridging structure, for a given channel, anchored at two points with one on either side of a fiber optic element contact region; (10) the at least one spring element is monolithic with respect to the channel; (11) the at least one spring element has a shaped tip that encounters the fiber optic element at an angle such that force is gradually applied to the fiber optic element as the fiber optic element is inserted; (12) the at least one spring element is capable of being moved to a low force loading or unloading position and then moved back to a retention or alignment position; (13) features that engage the fiber optic element and inhibit removal of the fiber optic element once inserted unless a retention device is moved to a loading or unloading position; (14) the at least one entry port and at least one channel including sufficient entry ports to and channels to receive and align at least four fiber optic elements; and (15) functionally connected entry ports and channels such that at least two fiber optics elements may be inserted and aligned to optically engage one another.

In a second aspect of the invention a method for aligning a fiber optic element to a second fiber optic element or to another optical component includes: (a) providing at least one fiber optic element; (b) providing a fiber optic alignment device that includes: (i) at least one fiber optic element entry port defined by at least a portion of the plurality of layers; (ii) at least one fiber optic element insertion channel extending from the at least one fiber optic entry port through at least a portion of the plurality of layers; (iii) a first side alignment feature, for each insertion channel, running at least part way along a side of the insertion channel; (iv) an alignment surface, for each insertion channel, selected from the group consisting of a top alignment surface and a bottom alignment surface defining a respective top or bottom of the insertion channel; and (v) at least one spring element, for each insertion channel, that forces an inserted fiber optic element into an alignment position; (b) inserting at least one fiber optic element into the at least one entry port and at least one channel of the fiber optic alignment device; and (c) fully engaging the at least one spring element to align the at least one fiber optic element.

Numerous variations of the second aspect of the invention are possible and include, for example: (1) the at least one fiber optic alignment device being configured with sufficient entry ports to and channels to receive and align a plurality of fiber optic elements which can range from 2, 3, 4, . . . , 100, or more; (2) the at least one fiber optic alignment device being configured with functionally connected entry ports and channels such that at least two fiber optics elements may be inserted and aligned to optically engage one another; (3). the at least one fiber optic alignment device being configured with functionally connected entry ports and channels such that at least one fiber optic element may be inserted and aligned to another optical component, e.g. an LED, a laser, a splitter, a coupler, a sensor, one or more elements of a CCD array, and the like; (4) the at least one fiber optic alignment device being configured with functionally connected entry ports and channels such that a plurality of pairs of fiber optics elements may be inserted and aligned to optically engage one another in a plurality of pairs; (5). the at least one fiber optic alignment device being configured with functionally connected entry ports and channels such that a plurality of fiber optic elements may be inserted and aligned to a plurality of other optical components, e.g. LEDs, lasers, splitters, couplers, sensors, elements of a CCD arrays, and the like; (6) each of the at least on fiber optic alignment devices provides for one or more of: (i) passive alignment of a plurality of fiber optic elements in a parallel linear array, (ii) passive alignment of a plurality of fiber optic elements in a parallel two-dimensional linear array, (iii) passive alignment of a plurality of fiber optic elements in an end to end (i.e. serial) configuration; and (7) any of the variations of aspect 1 taken alone or in any combinations.

In a third aspect of the invention a method for fabricating a plurality of multi-layer three-dimensional fiber optic alignment devices, includes: (a) forming a plurality of successively formed layers, wherein each successive layer comprises at least two materials and is formed on and adhered to a previously formed layer, one of the at least two materials is a structural material and the other of the at least two materials is a sacrificial material, and wherein each successive layer defines a successive cross-section of the three-dimensional structure, and wherein the forming of each of the plurality of successive layers includes: (i) depositing a first of the at least two materials; (ii) depositing a second of the at least two materials; (iii) planarizing the first and second materials to set a boundary level for the layer; and (b) after the forming of the plurality of successive layers, separating at least a portion of the sacrificial material from multiple layers of the structural material to reveal the three-dimensional devices, wherein the devices have configurations that each include: (i) at least one fiber optic element entry port defined by at least a portion of the plurality of layers; (ii) at least one fiber optic element insertion channel extending from the at least one fiber optic entry port through at least a portion of the plurality of layers; (iii) a first side alignment feature, for each insertion channel, running at least part way along a side of the insertion channel; (iv) an alignment surface, for each insertion channel, selected from the group consisting of a top alignment surface and a bottom alignment surface defining a respective top or bottom of the insertion channel; and (v) at least one spring element, for each insertion channel, that forces an inserted fiber optic element into an alignment position.

Numerous variations of the third aspect of the invention are possible and include, for example those variations set forth for aspects 1 or 2, taken alone or in any combination that does not eliminate all useful advantages of the combination.

Other aspects of the invention will be understood by those of skill in the art upon review of the teachings herein. Other aspects of the invention may involve combinations of the above noted aspects of the invention. These other aspects of the invention may provide various combinations of the aspects presented above as well as provide other configurations, structures, functional relationships, and processes that have not been specifically set forth above.

BRIEF DESCRIPTION OF THE DRAWINGS

FIGS. 1A-1C schematically depict side views of various stages of a CC mask plating process, while FIGS. 1D-1G schematically depict a side views of various stages of a CC mask plating process using a different type of CC mask.

FIGS. 4A-4F schematically depict the formation of a first layer of a structure using adhered mask plating where the blanket deposition of a second material overlays both the openings between deposition locations of a first material and the first material itself.

FIG. 4G depicts the completion of formation of the first layer resulting from planarizing the deposited materials to a desired level.

FIGS. 4H and 4I respectively depict the state of the process after formation of the multiple layers of the structure and after release of the structure from the sacrificial material.

DETAILED DESCRIPTION OF PREFERRED EMBODIMENTS

Electrochemical Fabrication in General

Figure 2A:
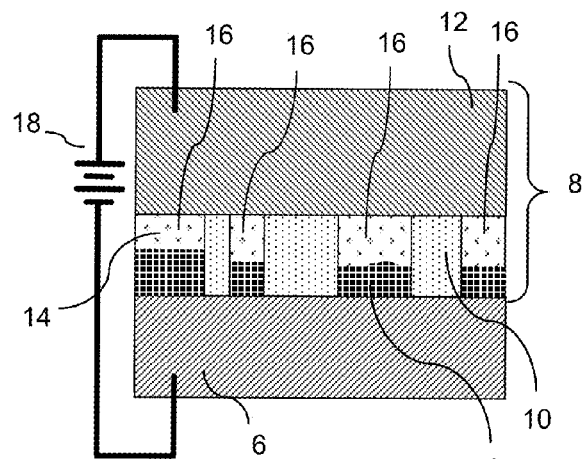
FIGS. 2A-2F schematically depict side views of various stages of an electrochemical fabrication process as applied to the formation of a particular structure where a sacrificial material is selectively deposited while a structural material is blanket deposited.
Figure 2B:
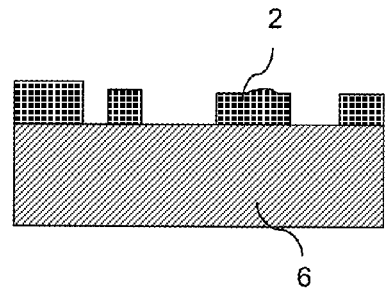
Figure 2C:
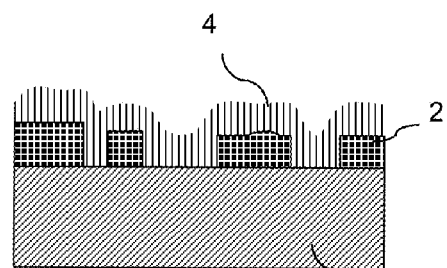
Figure 2D:
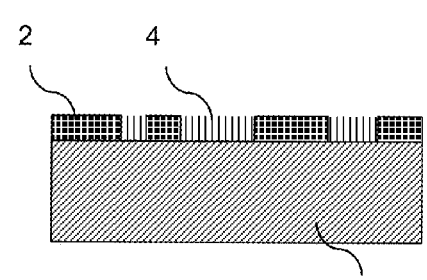
Figure 2E:
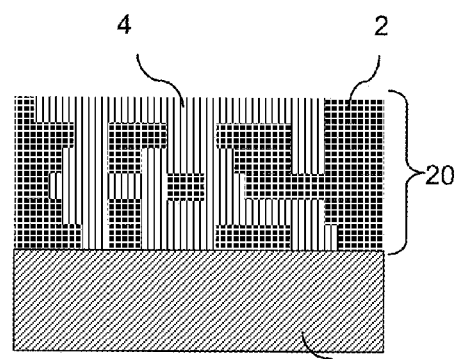
Figure 2F:
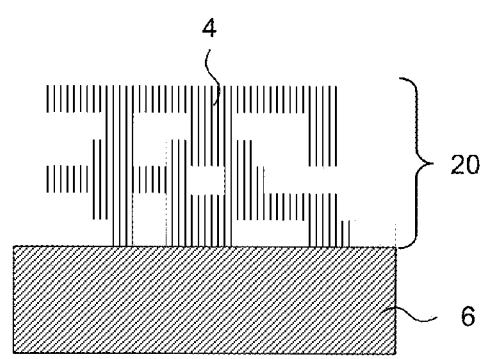
Figure 3A:
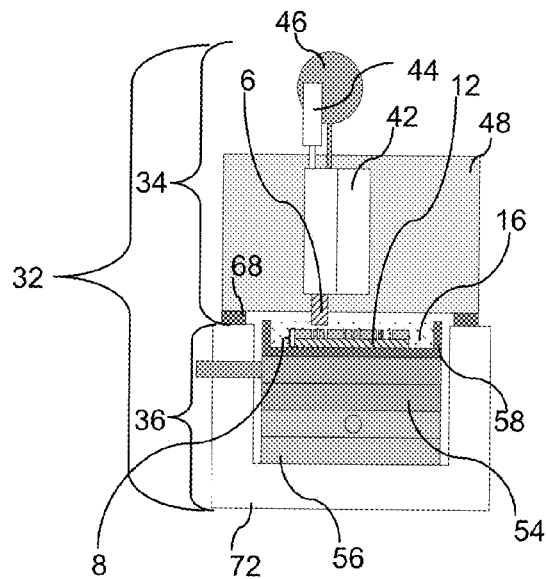
FIGS. 3A-3C schematically depict side views of various example subassemblies that may be used in manually implementing the electrochemical fabrication method depicted in FIGS. 2A-2F.
Figure 3B:
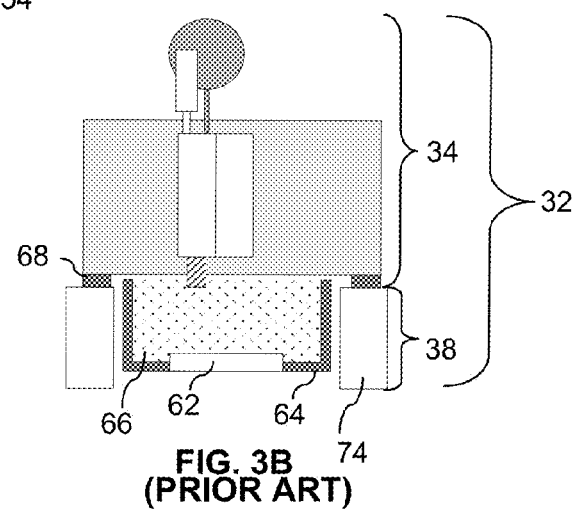
Figure 3C:
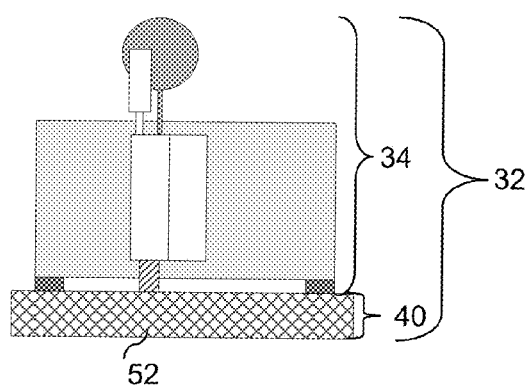

FIGS. 1A-1G, 2A-2F, and 3A-3C illustrate various features of one form of electrochemical fabrication. Other electrochemical fabrication techniques are set forth in the '630 patent referenced above, in the various previously incorporated publications, in various other patents and patent applications incorporated herein by reference. Still others may be derived from combinations of various approaches described in these publications, patents, and applications, or are otherwise known or ascertainable by those of skill in the art from the teachings set forth herein. All of these techniques may be combined with those of the various other embodiments or various aspects of the invention to yield enhanced embodiments. Still other embodiments may be derived from mixing and matching elements and steps into new combinations based on the various embodiments set forth herein.

FIGS. 4A-4I illustrate sides views of various states in an alternative multi-layer, multi-material electrochemical fabrication process. FIGS. 4A-4G illustrate various stages in the formation of a single layer of a multi-layer fabrication process where a second metal is deposited on a first metal as well as in openings in the first metal so that the first and second metal form part of the layer. In FIG. 4A a side view of a substrate 82 having a surface 88 is shown, onto which patternable photoresist 84 is cast as shown in FIG. 4B. In FIG. 4C, a pattern of resist is shown that results from the curing, exposing, and developing of the resist. The patterning of the photoresist 84 results in openings or apertures 92(a)-92(c) extending from a surface 86 of the photoresist through the thickness of the photoresist to surface 88 of the substrate 82. In FIG. 4D a metal 94 (e.g. nickel) is shown as having been electroplated into the openings 92(a)-92(c). In FIG. 4E the photoresist has been removed (i.e. chemically stripped) from the substrate to expose regions of the substrate 82 which are not covered with the first metal 94. In FIG. 4F a second metal 96 (e.g. silver) is shown as having been blanket electroplated over the entire exposed portions of the substrate 82 (which is conductive) and over the first metal 94 (which is also conductive). FIG. 4G depicts the completed first layer of the structure which has resulted from the planarization of the first and second metals down to a height that exposes the first metal and sets a thickness for the first layer. In FIG. 4H the result of repeating the process steps shown in FIGS. 4B-4G several times to form a multi-layer structure are shown where each layer consists of two materials. For most applications, one of these materials is removed as shown in FIG. 4I to yield a desired 3-D structure 98 (e.g. component or device).

Various embodiments of various aspects of the invention are directed to formation of three-dimensional structures from materials some, or all, of which may be electrodeposited (as illustrated in FIGS. 1A-4I) or electroless deposited. Some of these structures may be formed from a single build level formed from one or more deposited materials while others are formed from a plurality of build layers each including at least two materials (e.g. two or more layers, more preferably five or more layers, and most preferably ten or more layers). In some embodiments, layer thicknesses may be as small as one micron or as large as fifty microns. In other embodiments, thinner layers may be used while in other embodiments, thicker layers may be used. In some embodiments structures having features positioned with micron level precision and minimum features size on the order of tens of microns are to be formed. In other embodiments structures with less precise feature placement and/or larger minimum features may be formed. In still other embodiments, higher precision and smaller minimum feature sizes may be desirable. In the present application meso-scale and millimeter-scale have the same meaning and refer to devices that may have one or more dimensions extending into the 0.5-20 millimeter range, or somewhat larger and with features positioned with precision in the 0.1-10 micron range and with minimum features sizes on the order of 1-100 microns.

The various embodiments, alternatives, and techniques disclosed herein may form multi-layer structures using a single patterning technique on all layers or using different patterning techniques on different layers. For example, Various embodiments of the invention may perform selective patterning operations using conformable contact masks and masking operations (i.e. operations that use masks which are contacted to but not adhered to a substrate), proximity masks and masking operations (i.e. operations that use masks that at least partially selectively shield a substrate by their proximity to the substrate even if contact is not made), non-conformable masks and masking operations (i.e. masks and operations based on masks whose contact surfaces are not significantly conformable), and/or adhered masks and masking operations (masks and operations that use masks that are adhered to a substrate onto which selective deposition or etching is to occur as opposed to only being contacted to it). Conformable contact masks, proximity masks, and non-conformable contact masks share the property that they are preformed and brought to, or in proximity to, a surface which is to be treated (i.e. the exposed portions of the surface are to be treated). These masks can generally be removed without damaging the mask or the surface that received treatment to which they were contacted, or located in proximity to. Adhered masks are generally formed on the surface to be treated (i.e. the portion of that surface that is to be masked) and bonded to that surface such that they cannot be separated from that surface without being completely destroyed or damaged beyond any point of reuse. Adhered masks may be formed in a number of ways including (1) by application of a photoresist, selective exposure of the photoresist, and then development of the photoresist, (2) selective transfer of pre-patterned masking material, and/or (3) direct formation of masks from computer controlled depositions of material.

Patterning operations may be used in selectively depositing material and/or may be used in the selective etching of material. Selectively etched regions may be selectively filled in or filled in via blanket deposition, or the like, with a different desired material. In some embodiments, the layer-by-layer build up may involve the simultaneous formation of portions of multiple layers. In some embodiments, depositions made in association with some layer levels may result in depositions to regions associated with other layer levels (i.e. regions that lie within the top and bottom boundary levels that define a different layer's geometric configuration) . Such use of selective etching and interlaced material deposition in association with multiple layers is described in U.S. patent application Ser. No. 10/434,519, by Smalley, now U.S. Pat. No. 7,252,861, and entitled "Methods of and Apparatus for Electrochemically Fabricating Structures Via Interlaced Layers or Via Selective Etching and Filling of Voids" which is hereby incorporated herein by reference as if set forth in full.

Temporary substrates on which structures may be formed may be of the sacrificial-type (i.e. destroyed or damaged during separation of deposited materials to the extent they cannot be reused), non-sacrificial-type (i.e. not destroyed or excessively damaged, i.e. not damaged to the extent they may not be reused, e.g. with a sacrificial or release layer located between the substrate and the initial layers of a structure that is formed). Non-sacrificial substrates may be considered reusable, with little or no rework (e.g. replanarizing one or more selected surfaces or applying a release layer, and the like) though they may or may not be reused for a variety of reasons.

Definitions

This section of the specification is intended to set forth definitions for a number of specific terms that may be useful in describing the subject matter of the various embodiments of the invention. It is believed that the meanings of most if not all of these terms is clear from their general use in the specification but they are set forth hereinafter to remove any ambiguity that may exist. It is intended that these definitions be used in understanding the scope and limits of any claims that use these specific terms. As far as interpretation of the claims of this patent disclosure are concerned, it is intended that these definitions take presence over any contradictory definitions or allusions found in any materials which are incorporated herein by reference.

"Build" as used herein refers, as a verb, to the process of building a desired structure (or part) or plurality of structures (or parts) from a plurality of applied or deposited materials which are stacked and adhered upon application or deposition or, as a noun, to the physical structure (or part) or structures (or parts) formed from such a process. Depending on the context in which the term is used, such physical structures may include a desired structure embedded within a sacrificial material or may include only desired physical structures which may be separated from one another or may require dicing and/or slicing to cause separation.

"Build axis" or "build orientation" is the axis or orientation that is substantially perpendicular to substantially planar levels of deposited or applied materials that are used in building up a structure. The planar levels of deposited or applied materials may be or may not be completely planar but are substantially so in that the overall extent of their cross-sectional dimensions are significantly greater than the height of any individual deposit or application of material (e.g. 100, 500, 1000, 5000, or more times greater). The planar nature of the deposited or applied materials may come about from use of a process that leads to planar deposits or it may result from a planarization process (e.g. a process that includes mechanical abrasion, e.g. lapping, fly cutting, grinding, or the like) that is used to remove material regions of excess height. Unless explicitly noted otherwise, "vertical" as used herein refers to the build axis or nominal build axis (if the layers are not stacking with perfect registration) while "horizontal" or "lateral" refers to a direction within the plane of the layers (i.e. the plane that is substantially perpendicular to the build axis).

"Build layer" or "layer of structure" as used herein does not refer to a deposit of a specific material but instead refers to a region of a build located between a lower boundary level and an upper boundary level which generally defines a single cross-section of a structure being formed or structures which are being formed in parallel. Depending on the details of the actual process used to form the structure, build layers are generally formed on and adhered to previously formed build layers. In some processes the boundaries between build layers are defined by planarization operations which result in successive build layers being formed on substantially planar upper surfaces of previously formed build layers. In some embodiments, the substantially planar upper surface of the preceding build layer may be textured to improve adhesion between the layers. In other build processes, openings may exist in or be formed in the upper surface of a previous but only partially formed build layers such that the openings in the previous build layers are filled with materials deposited in association with current build layers which will cause interlacing of build layers and material deposits. Such interlacing is described in U.S. patent application Ser. No. 10/434,519 now U.S. Pat. No. 7,252,861. This referenced application is incorporated herein by reference as if set forth in full. In most embodiments, a build layer includes at least one primary structural material and at least one primary sacrificial material. However, in some embodiments, two or more primary structural materials may be used without a primary sacrificial material (e.g. when one primary structural material is a dielectric and the other is a conductive material). In some embodiments, build layers are distinguishable from each other by the source of the data that is used to yield patterns of the deposits, applications, and/or etchings of material that form the respective build layers. For example, data descriptive of a structure to be formed which is derived from data extracted from different vertical levels of a data representation of the structure define different build layers of the structure. The vertical separation of successive pairs of such descriptive data may define the thickness of build layers associated with the data. As used herein, at times, "build layer" may be loosely referred simply as "layer". In many embodiments, deposition thickness of primary structural or sacrificial materials (i.e. the thickness of any particular material after it is deposited) is generally greater than the layer thickness and a net deposit thickness is set via one or more planarization processes which may include, for example, mechanical abrasion (e.g. lapping, fly cutting, polishing, and the like) and/or chemical etching (e.g. using selective or non-selective etchants). The lower boundary and upper boundary for a build layer may be set and defined in different ways. From a design point of view they may be set based on a desired vertical resolution of the structure (which may vary with height). From a data manipulation point of view, the vertical layer boundaries may be defined as the vertical levels at which data descriptive of the structure is processed or the layer thickness may be defined as the height separating successive levels of cross-sectional data that dictate how the structure will be formed. From a fabrication point of view, depending on the exact fabrication process used, the upper and lower layer boundaries may be defined in a variety of different ways. For example they may be defined by planarization levels or effective planarization levels (e.g. lapping levels, fly cutting levels, chemical mechanical polishing levels, mechanical polishing levels, vertical positions of structural and/or sacrificial materials after relatively uniform etch back following a mechanical or chemical mechanical planarization process). As another example, they may be defined by levels at which process steps or operations are repeated. As still a further example, they may be defined, at least theoretically, as lateral extents of structural material can change to define new cross-sectional features of a structure.

"Layer thickness" is the height along the build axis between a lower boundary of a build layer and an upper boundary of that build layer.

"Planarization" is a process that tends to remove materials, above a desired plane, in a substantially non-selective manner such that all deposited materials are brought to a substantially common height or desired level (e.g. within 20%, 10%, 5%, or even 1% of a desired layer height or boundary level). For example, lapping removes material in a substantially non-selective manner though some amount of recession of one material or another may occur (e.g. copper may recess relative to nickel). Planarization may occur primarily via mechanical means, e.g. lapping, grinding, fly cutting, milling, sanding, abrasive polishing, frictionally induced melting, other machining operations, or the like (i.e. mechanical planarization). Mechanical planarization may be followed or proceeded by thermally induced planarization (e.g. melting) or chemically induced planarization (e.g. etching). Planarization may occur primarily via a chemical and/or electrical means (e.g. chemical etching, electrochemical etching, or the like). Planarization may occur via a simultaneous combination of mechanical and chemical etching (e.g. chemical mechanical polishing (CMP)).

"Structural material" as used herein refers to a material that remains part of the structure when put into use.

"Supplemental structural material" as used herein refers to a material that forms part of the structure when the structure is put to use but is not added as part of the build layers but instead is added to a plurality of layers simultaneously (e.g. via one or more coating operations that applies the material, selectively or in a blanket fashion, to a one or more surfaces of a desired build structure that has been released from a sacrificial material.

"Primary structural material" as used herein is a structural material that forms part of a given build layer and which is typically deposited or applied during the formation of that build layer and which makes up more than 20% of the structural material volume of the given build layer. In some embodiments, the primary structural material may be the same on each of a plurality of build layers or it may be different on different build layers. In some embodiments, a given primary structural material may be formed from two or more materials by the alloying or diffusion of two or more materials to form a single material. The structural material on a given layer may be a single primary structural material or may be multiple primary structural materials and may further include one or more secondary structural materials.

"Secondary structural material" as used herein is a structural material that forms part of a given build layer and is typically deposited or applied during the formation of the given build layer but is not a primary structural material as it individually accounts for only a small volume of the structural material associated with the given layer. A secondary structural material will account for less than 20% of the volume of the structural material associated with the given layer. In some preferred embodiments, each secondary structural material may account for less than 10%, 5%, or even 2% of the volume of the structural material associated with the given layer. Examples of secondary structural materials may include seed layer materials, adhesion layer materials, barrier layer materials (e.g. diffusion barrier material), and the like. These secondary structural materials are typically applied to form coatings having thicknesses less than 2 microns, 1 micron, 0.5 microns, or even 0.2 microns or less). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Functional structural material" as used herein is a structural material that would have been removed as a sacrificial material but for its actual or effective encapsulation by other structural materials. Effective encapsulation refers, for example, to the inability of an etchant to attack the functional structural material due to inaccessibility that results from a very small area of exposure and/or due to an elongated or tortuous exposure path. For example, large (10,000 $\mu m^2$) but thin (e.g. less than 0.5 microns) regions of sacrificial copper sandwiched between deposits of nickel may define regions of functional structural material depending on ability of a release etchant to remove the sandwiched copper.

"Sacrificial material" is material that forms part of a build layer but is not a structural material. Sacrificial material on a given build layer is separated from structural material on that build layer after formation of that build layer is completed and more generally is removed from a plurality of layers after completion of the formation of the plurality of layers during a "release" process that removes the bulk of the sacrificial material or materials. In general sacrificial material is located on a build layer during the formation of one, two, or more subsequent build layers and is thereafter removed in a manner that does not lead to a planarized surface. Materials that are applied primarily for masking purposes, i.e. to allow subsequent selective deposition or etching of a material, e.g. photoresist that is used in forming a build layer but does not form part of the build layer) or that exist as part of a build for less than one or two complete build layer formation cycles are not considered sacrificial materials as the term is used herein but instead shall be referred as masking materials or as temporary materials. These separation processes are sometimes referred to as a release process and may or may not involve the separation of structural material from a build substrate. In many embodiments, sacrificial material within a given build layer is not removed until all build layers making up the three-dimensional structure have been formed. Of course sacrificial material may be, and typically is, removed from above the upper level of a current build layer during planarization operations during the formation of the current build layer. During release or separation, sacrificial material is typically removed via a chemical etching operation but in some embodiments it may be removed via a melting operation, electrochemical etching operation, laser ablation, or the like. In typical structures, the removal of the sacrificial material (i.e. release of the structural material from the sacrificial material) does not result in planarized surfaces but instead results in surfaces that are dictated by the boundaries of structural materials located on each build layer. Sacrificial materials are typically distinct from structural materials by having different properties therefrom (e.g. chemical etchability, hardness, melting point, etc.) but in some cases, as noted previously, what would have been a sacrificial material may become a structural material by its actual or effective encapsulation by other structural materials. Similarly, structural materials may be used to form sacrificial structures that are separated from a desired structure during a release process via the sacrificial structures being only attached to sacrificial material or potentially by dissolution of the sacrificial structures themselves using a process that is insufficient to reach structural material that is intended to form part of a desired structure. It should be understood that in some embodiments, small amounts of structural material may be removed, after or during release of sacrificial material. Such small amounts of structural material may have been inadvertently formed due to imperfections in the fabrication process or may result from the proper application of the process but may result in features that are less than optimal (e.g. layers with stairs steps in regions where smooth sloped surfaces are desired. In such cases the volume of structural material removed is typically minuscule compared to the amount that is retained and thus such removal is ignored when labeling materials as sacrificial or structural. Sacrificial materials are typically removed by a dissolution process, or the like, that destroys the geometric configuration of the sacrificial material as it existed on the build layers. In many embodiments, the sacrificial material is a conductive material such as a metal though in some embodiments it may be a dielectric material and even a photoresist material. As will be discussed hereafter, masking materials though typically sacrificial in nature are not termed sacrificial materials herein unless they meet the required definition of sacrificial material.

"Supplemental sacrificial material" as used herein refers to a material that does not form part of the structure when the structure is put to use and is not added as part of the build layers but instead is added to a plurality of layers simultaneously (e.g. via one or more coating operations that applies the material, selectively or in a blanket fashion, to a one or more surfaces of a desired build structure that has been released from an initial sacrificial material. This supplemental sacrificial material will remain in place for a period of time and/or during the performance of certain post layer formation operations, e.g. to protect the structure that was released from a primary sacrificial material, but will be removed prior to putting the structure to use.

"Primary sacrificial material" as used herein is a sacrificial material that is located on a given build layer and which is typically deposited or applied during the formation of that build layer and which makes up more than 20% of the sacrificial material volume of the given build layer. In some embodiments, the primary sacrificial material may be the same on each of a plurality of build layers or may be different on different build layers. In some embodiments, a given primary sacrificial material may be formed from two or more materials by the alloying or diffusion of two or more materials to form a single material. The sacrificial material on a given layer may be a single primary sacrificial material or may be multiple primary sacrificial materials and may further include one or more secondary sacrificial materials.

"Secondary sacrificial material" as used herein is a sacrificial material that is located on a given build layer and is typically deposited or applied during the formation of the build layer but is not a primary sacrificial materials as it individually accounts for only a small volume of the sacrificial material associated with the given layer. A secondary sacrificial material will account for less than 20% of the volume of the sacrificial material associated with the given layer. In some preferred embodiments, each secondary sacrificial material may account for less than 10%, 5%, or even 2% of the volume of the sacrificial material associated with the given layer. Examples of secondary sacrificial materials may include seed layer materials, adhesion layer materials, barrier layer materials (e.g. diffusion barrier material), and the like. These secondary sacrificial materials are typically applied to form coatings having thicknesses less than 2 microns, 1 micron, 0.5 microns, or even 0.2 microns or less). The coatings may be applied in a conformal or directional manner (e.g. via CVD, PVD, electroless deposition, or the like). Such coatings may be applied in a blanket manner or in a selective manner. Such coatings may be applied in a planar manner (e.g. over previously planarized layers of material) as taught in U.S. patent application Ser. No. 10/607,931, now U.S. Pat. No. 7,239,219. In other embodiments, such coatings may be applied in a non-planar manner, for example, in openings in and over a patterned masking material that has been applied to previously planarized layers of material as taught in U.S. patent application Ser. No. 10/841,383, now U.S. Pat. No. 7,195,989. These referenced applications are incorporated herein by reference as if set forth in full herein.

"Adhesion layer", "seed layer", "barrier layer", and the like refer to coatings of material that are thin in comparison to the layer thickness and thus generally form secondary structural material portions or sacrificial material portions of some layers. Such coatings may be applied uniformly over a previously formed build layer, they may be applied over a portion of a previously formed build layer and over patterned structural or sacrificial material existing on a current (i.e. partially formed) build layer so that a non-planar seed layer results, or they may be selectively applied to only certain locations on a previously formed build layer. In the event when such coatings are non-selectively applied, selected portions may be removed (1) prior to depositing either an additional sacrificial material or structural material as part of a current layer or (2) prior to beginning formation of the next layer or they may remain in place through the layer build up process and then be etched away after formation of a plurality of build layers.

"Masking material" is a material that may be used as a tool in the process of forming a build layer but does not form part of that build layer. Masking material is typically a photopolymer or photoresist material or other material that may be readily patterned. Masking material is typically a dielectric. Masking material, though typically sacrificial in nature, is not a sacrificial material as the term is used herein. Masking material is typically applied to a surface during the formation of a build layer for the purpose of allowing selective deposition, etching, or other treatment and is removed either during the process of forming that build layer or immediately after the formation of that build layer.

"Multilayer structures" are structures formed from multiple build layers of deposited or applied materials.

"Multilayer three-dimensional (or 3D or 3-D) structures" are Multilayer Structures wherein the structural material portions of at least two layers are not identical in configuration, not identical lateral positions, or not identical in orientation (i.e. the structural materials on the two layers do not completely overlap one another).

"Complex multilayer three-dimensional (or 3D or 3-D) structures" are multilayer three-dimensional structures formed from at least three layers where a line may be defined that hypothetically extends vertically through at least some portion of the build layers of the structure and that extends from structural material through sacrificial material and back through structural material or extends from sacrificial material through structural material and back through sacrificial material (these might be termed vertically complex multilayer three-dimensional structures). Alternatively, complex multilayer three-dimensional structures may be defined as multilayer three-dimensional structures formed from at least two layers where a line may be defined that hypothetically extends horizontally through at least some portion of a build layer of the structure that will extend from structural material through sacrificial material and back through structural material or will extend from sacrificial material through structural material and back through sacrificial material (these might be termed horizontally complex multilayer three-dimensional structures). Worded another way, in complex multilayer three-dimensional structures, a vertically or horizontally extending hypothetical line will extend from one of structural material or void (when the sacrificial material is removed) to the other of void or structural material and then back to structural material or void as the line is traversed along at least a portion of its length.

"Moderately complex multilayer three-dimensional (or 3D or 3-D) structures are complex multilayer 3D structures for which the alternating of void and structure or structure and void not only exists along one of a vertically or horizontally extending line but along lines extending both vertically and horizontally.

"Highly complex multilayer (or 3D or 3-D) structures are complex multilayer 3D structures for which the structure-to-void-to-structure or void-to-structure-to-void alternating occurs not only once along the line but occurs a plurality of times along a definable horizontally or vertically extending line.

"Up-facing feature" is an element dictated by the cross-sectional data for a given build layer "n" and a next build layer "n+1" that is to be formed from a given material that exists on the build layer "n" but does not exist on the immediately succeeding build layer "n+1". For convenience the term "up-facing feature" will apply to such features regardless of the build orientation.

"Down-facing feature" is an element dictated by the cross-sectional data for a given build layer "n" and a preceding build layer "n−1" that is to be formed from a given material that exists on build layer "n" but does not exist on the immediately preceding build layer "n−1". As with up-facing features, the term "down-facing feature" shall apply to such features regardless of the actual build orientation.

"Continuing region" is the portion of a given build layer "n" that is dictated by the cross-sectional data for the given build layer "n", a next build layer "n+1" and a preceding build layer "n−1" that is neither up-facing nor down-facing for the build layer "n".

"Minimum feature size" or "MFS" refers to a necessary or desirable spacing between structural material elements on a given layer that are to remain distinct in the final device configuration. If the minimum feature size is not maintained for structural material elements on a given layer, the fabrication process may result in structural material inadvertently bridging what were intended to be two distinct elements (e.g. due to masking material failure or failure to appropriately fill voids with sacrificial material during formation of the given layer such that during formation of a subsequent layer structural material inadvertently fills the void). More care during fabrication can lead to a reduction in minimum feature size. Alternatively, a willingness to accept greater losses in productivity (i.e. lower yields) can result in a decrease in the minimum feature size. However, during fabrication for a given set of process parameters, inspection diligence, and yield (successful level of production) a minimum design feature size is set in one way or another. The above described minimum feature size may more appropriately be termed minimum feature size of gaps or voids (e.g. the MFS for sacrificial material regions when sacrificial material is deposited first). Conversely a minimum feature size for structure material regions (minimum width or length of structural material elements) may be specified. Depending on the fabrication method and order of deposition of structural material and sacrificial material, the two types of minimum feature sizes may be the same or different. In practice, for example, using electrochemical fabrication methods as described herein, the minimum features size on a given layer may be roughly set to a value that approximates the layer thickness used to form the layer and it may be considered the same for both structural and sacrificial material widths. In some more rigorously implemented processes (e.g. with higher examination regiments and tolerance for rework), it may be set to an amount that is 80%, 50%, or even 30% of the layer thickness. Other values or methods of setting minimum feature sizes may be used. Worded another way, depending on the geometry of a structure, or plurality of structures, being formed, the structure, or structures, may include elements (e.g. solid regions) which have dimensions smaller than a first minimum feature size and/or have spacings, voids, openings, or gaps (e.g. hollow or empty regions) located between elements, where the spacings are smaller than a second minimum feature size where the first and second minimum feature sizes may be the same or different and where the minimum feature sizes represent lower limits at which formation of elements and/or spacing can be reliably formed. Reliable formation refers to the ability to accurately form or produce a given geometry of an element, or of the spacing between elements, using a given formation process, with a minimum acceptable yield. The minimum acceptable yield may depend on a number of factors including: (1) number of features present per layer, (2) numbers of layers, (3) the criticality of the successful formation of each feature, (4) the number and severity of other factors effecting overall yield, and (5) the desired or required overall yield for the structures or devices themselves. In some circumstances, the minimum size may be determined by a yield requirement per feature which is as low as 70%, 60%, or even 50%. While in other circumstances the yield requirement per feature may be as high as 90%, 95%, 99%, or even higher. In some circumstances (e.g. in producing a filter element) the failure to produce a certain number of desired features (e.g. 20-40% failure may be acceptable while in an electrostatic actuator the failure to produce a single small space between two moveable electrodes may result in failure of the entire device. The MFS, for example, may be defined as the minimum width of a narrow processing element (e.g. photoresist element or sacrificial material element) or structural element (e.g. structural material element) that may be reliably formed (e.g. 90-99.9 times out of 100) which is either independent of any wider structures or has a substantial independent length (e.g. 200-1000 microns) before connecting to a wider region.

Fiber Optic Alignment Devices, Methods and Methods for Making

FIGS. 5A to 5J provide various views of a device according to a first embodiment of the invention.

Figure 5A:
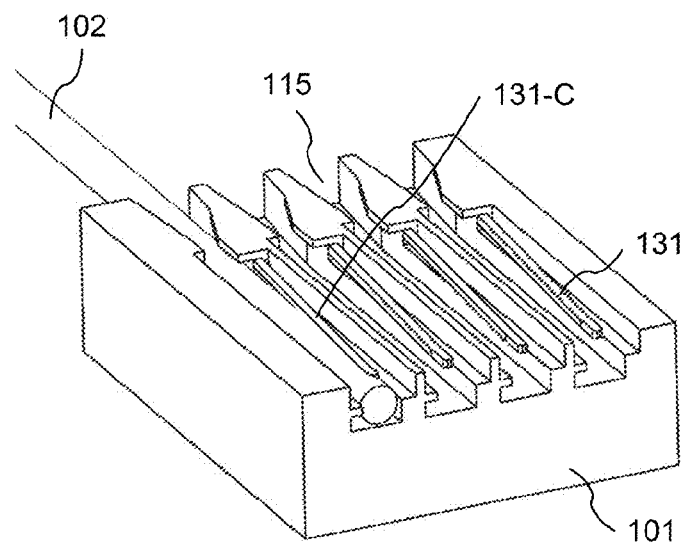
FIGS. 5A to 5J provide various views of a device according to a first embodiment of the invention.

FIG. 5A provides a perspective view of a 4 element fiber optic alignment device 101 along with a fiber optic element 102 inserted into a left most alignment slot wherein the device includes entry ports 115 at the upper portions of the figure, channels 116 (see FIGS. 5B & 5D) extending into the device, left side alignment features 121 (see FIGS. 5B and 5F), a bottom alignment surface or surfaces 111 (see FIGS. 5B and 5F), and a right side retention and uncompressed alignment spring arms 131 and compressed alignment spring arms 131-C. In some embodiment variations, the devices may include capping elements that cover at least portions of tops of the fiber and alignment channels. Such capping elements may be opaque or optically transparent depending on the application needs.

Figure 5B:
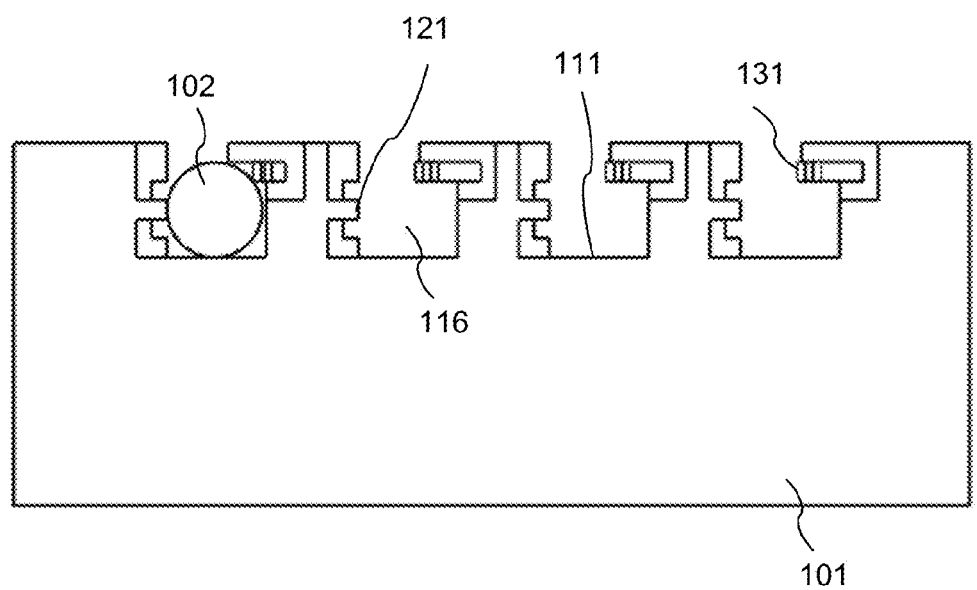

FIG. 5B provides front cut views of the device 101 of FIG. 5A (along with a single inserted fiber 102 in the left most channel) wherein the left side alignment features 121, bottom surfaces 116 and spring 131 tips can be seen.

Figure 5C:
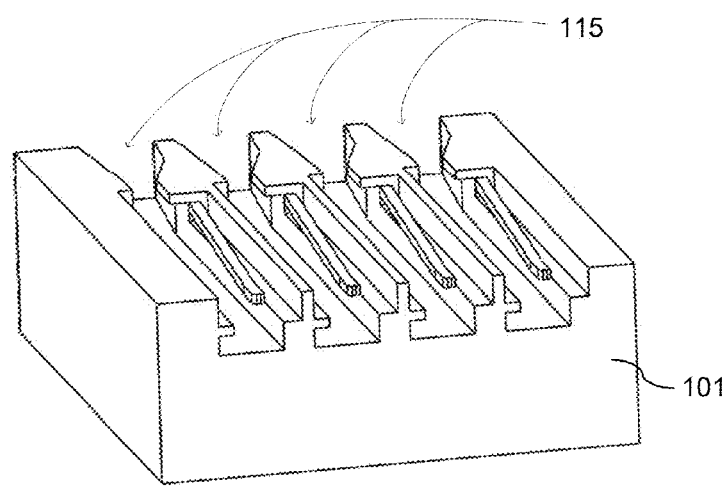
Figure 5D:
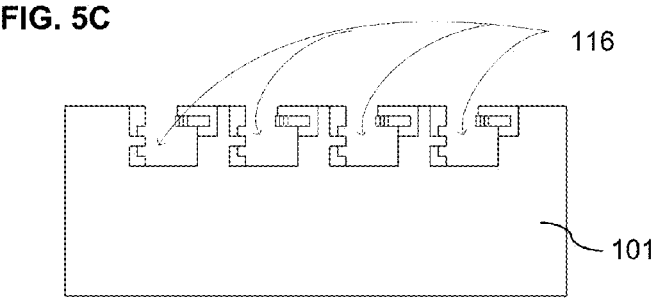
Figure 5E:
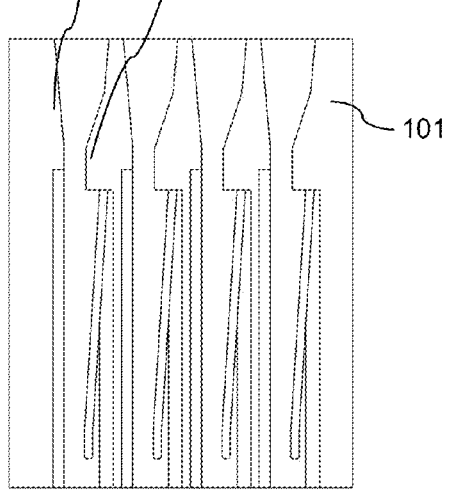

FIGS. 5C, 5D and 5E, respectively provide perspective, front and top views of the device of FIGS. 5A & 5B without the presence of a fiber optic element.

Figure 5F:
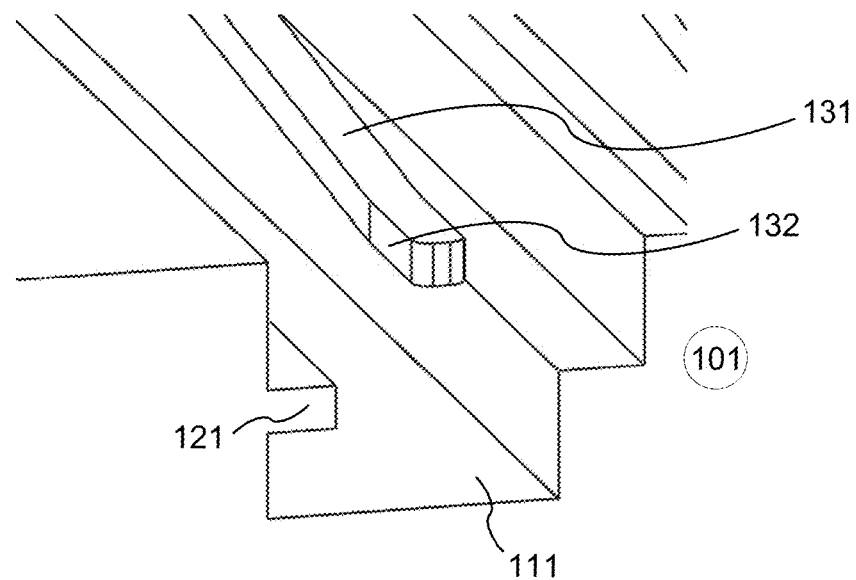
Figure 5G:
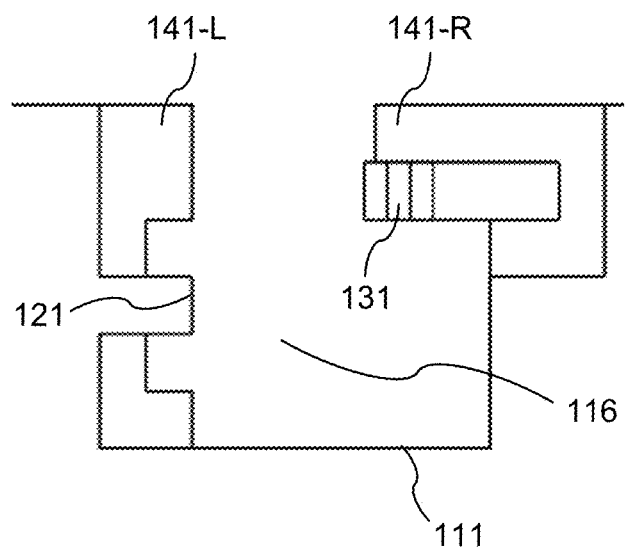

FIGS. 5F and 5G provide blown up perspective and front views of a single channel of the device of FIGS. 5A-5E pointing out the reference features and alignment spring features where left side alignment feature 121 can be seen, channel 116, bottom alignment surface 111, left and right entry guides 141-L and 141-R, uncompressed spring arm 131 and fiber optic contact surface 132.

Figure 5H:
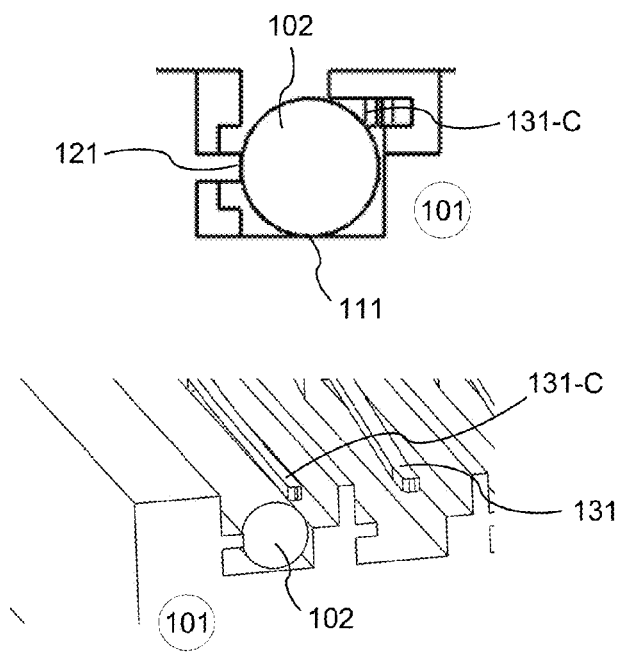
Figure 5I:
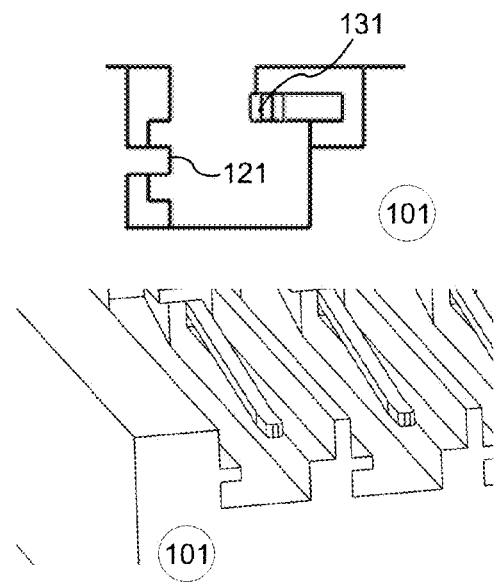
Figure 5J:
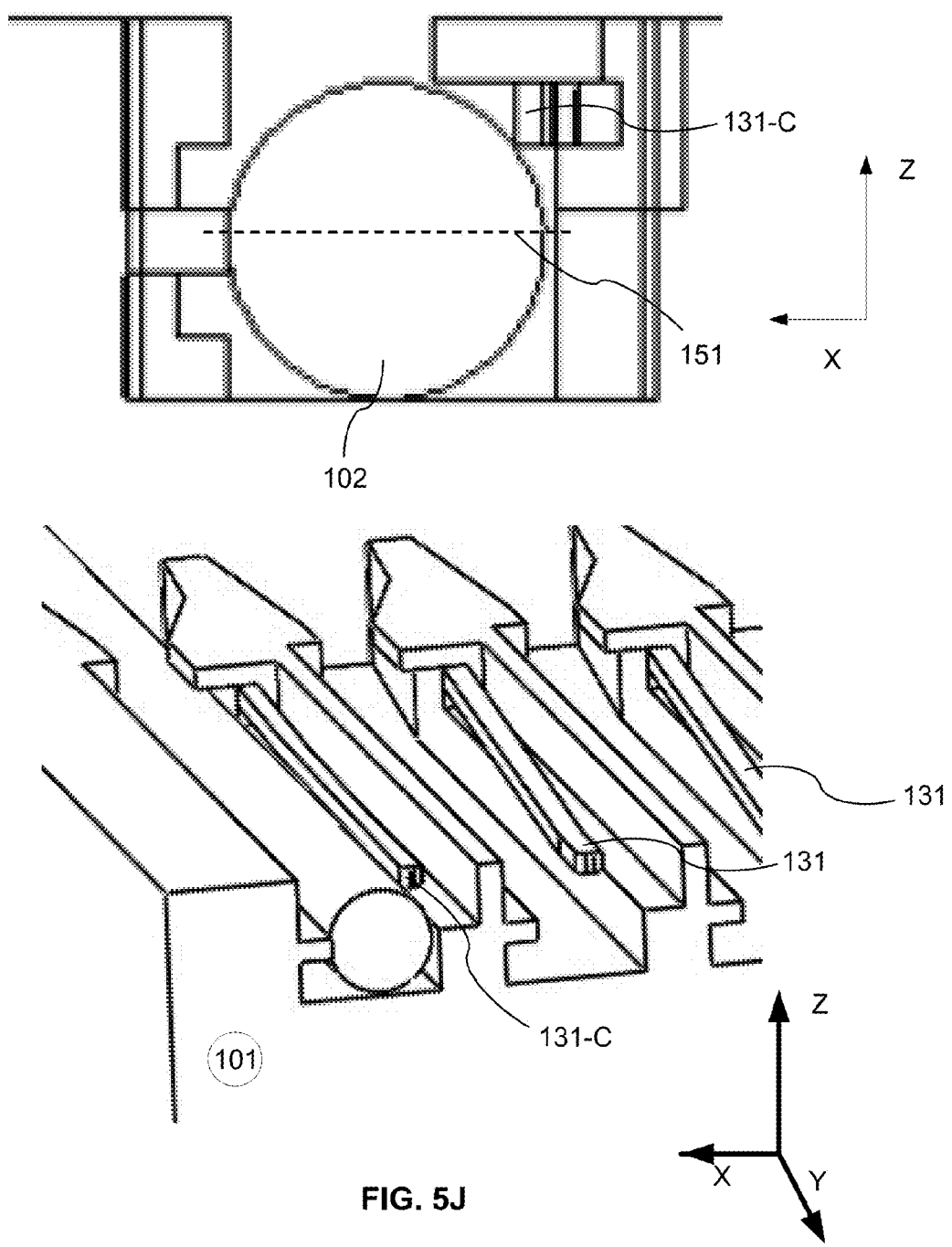

FIGS. 5H and 5I each show close up perspective and front views of the device of FIGS. 5A-5G with FIG. 5H showing an included fiber optic element and a compressed alignment spring 131-C and FIG. 5I showing the device without an inserted and aligned fiber optic element and with the alignment spring 131 not being compressed.

FIG. 5J again shows a perspective view and a close up front view of the portion of the perspective view that includes the fiber optic element 102 along with a center line of the fiber optic element 151 wherein some observable features include: (1) the alignment spring pushing fiber optic element against the left side alignment feature due to a leftward exerting force and against the bottom alignment surface by a downward force created by the spring contacting the fiber optic element above its centerline. (2) the left side provides for side alignment reference surface with the side aligned to a feature (e.g. formed from a single layer of structural material) of a multi-layer device (as it may be formed from a multi-layer, multi-material fabrication process, such as those described herein, with a layer stacking axis extending in the Z-direction) so as eliminate any layer-to-layer registration errors that may cause misalignment, (3) the bottom surface acts as second reference surface, (4) the alignment spring corner is positioned above the center line of the fiber, thus allowing the spring to apply a force that has both vertical and horizontal components for alignment purposes. The alignment spring can be optimized to apply a force strong enough to press the fiber against the references surfaces, but weak enough so that it does not damage the fiber. In other embodiments multiple alignment spring elements may be used sitting above or below one another in parallel along the length of the fiber optic element or sitting in series along the channel or passage length to help ensure that any bending of the fiber outside the device does not lead to angular misalignment of the fiber or fibers relative to another optical feature to which they are being aligned (e.g. another fiber or fibers or other optical components such as light sources (e.g. laser, LEDS), sensors, CCD array elements, splitters, merging elements). In some alternative embodiments two or more springs may be used with one or more applied to the side (e.g. vertical center surface) of the fiber optic element to yield a side or horizontally directed alignment force while another is applied to a horizontal surface (e.g. top or bottom surface) to provide a vertically directed alignment force. The preferred embodiments provide for passive alignment by spring elements (e.g. the only active motion is that of insertion of the fiber optic element(s)) while some other embodiments may provide for active alignment by moving compliant elements against selected surfaces of the fiber optic element(s) to cause alignment.

Of course in some alternative embodiments, bottom surface alignment features may be exchanged for top surface alignment features, left side alignment features may be exchanged for right side alignment features or even multi-layer features or multiple single layer features, and right side compressing spring arms may give rise to left side compressing springs or even downward or upward compressing springs. When formed from a multi-layer multi-material fabrication process such as the electrochemical deposition processes set forth herein, it is preferred that spring compression (i.e. structural deformation) occur primarily within planes of the layers however, out of plane deformation may be used in some embodiments. In some embodiments cantilever spring arms may be replaced by bridge-like spring elements that are supported on both ends with a fiber optic contact point being in the middle spring element. In other embodiments cantilever spring elements may take on different configurations and be supported by additional compressive elements such as those set forth in US Patent Publication No. 2012-0064227 which is incorporated herein by reference. In some alternative embodiments, different numbers of the entry ports and channels may be exist on a single device. In some alternatives devices may be formed with joining and/or multi-device alignment features on their outer surfaces so that multiple devices may be assembled or otherwise joined in precise configurations. In some embodiments, channel configurations may be located in a linear array, a stack of linear arrays (e.g. a two-dimensional array), in a fanned configuration, and more generally in any array converting configuration (e.g. one dimension to an enlarged one dimension configuration, a two-dimensional array to a one dimensional array, and order changing configuration, and the like).

Figure 6A:
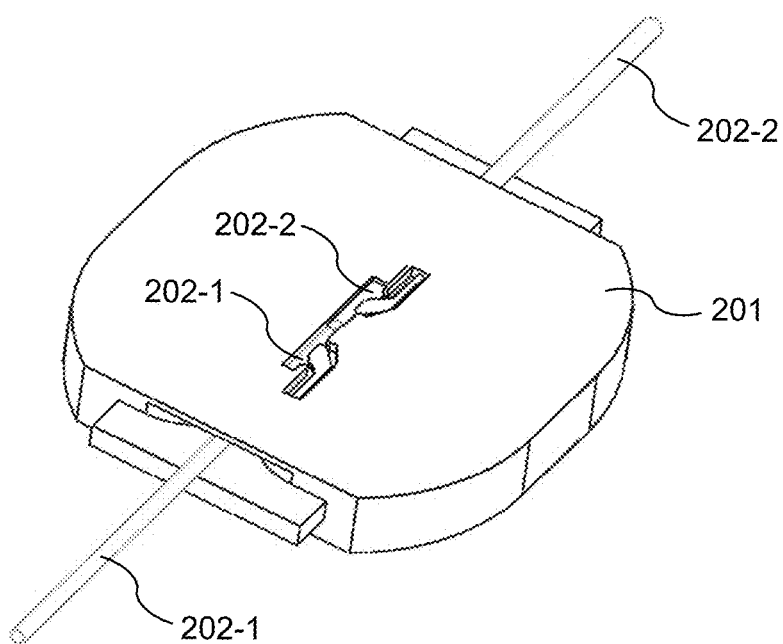
FIGS. 6A-6D provide various views of a device according to a second embodiment of the invention.

FIGS. 6A-6D provide various views of a device according to a second embodiment of the invention which is similar to that of the first embodiment with the primary exception that the device is configured to align two fibers end to end. In variations of the device, multiple pairs of fiber optics elements could be functionally coupled by inclusion of additional ports and channels in the device. In FIG. 6A fiber optic elements 201-1 and 202-2 are inserted into opposing entry ports on opposite sides of the device 201 with the ports joined by a single channel that includes a pair of alignment spring elements that bias the fiber optic elements against a common lower surface and a common sidewall feature. In some variations, the device may also include tabs or other movable elements that may drive the alignment springs from low force loading positions to higher force alignment positions or may force open the springs for low force loading and release the spring for locking alignment. In some embodiments, an insertion stop may be initially in the channel during loading of a first fiber optic element and removed prior to insertion of a second element such that the fiber optic element insertion depths may be precisely and unambiguously set relative to their respective alignment springs. In some embodiments, tapped sidewalls at entry ports may provide for easier insertion of fiber optic elements and in some embodiments slopped top and bottom surfaces may be provided to provide easier insertion as well. Such surfaces may exist permanently or may be temporarily created. Creation of such fixed or temporary slopped surfaces may be created via original design (e.g. CAD design which is layerized for layer-by-layer fabrication purposes.) or deformed, elastically or inelastically, into a desired configuration after layer-by-layer fabrication is completed.

Figure 6B:
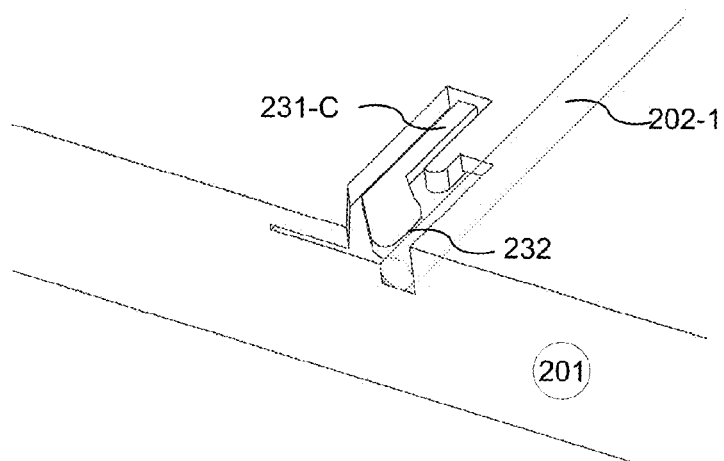
Figure 6C:
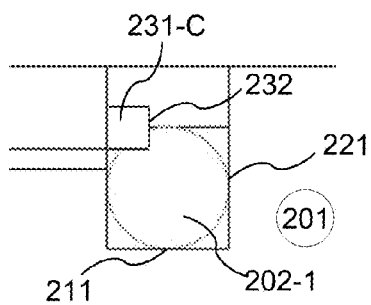
Figure 6D:
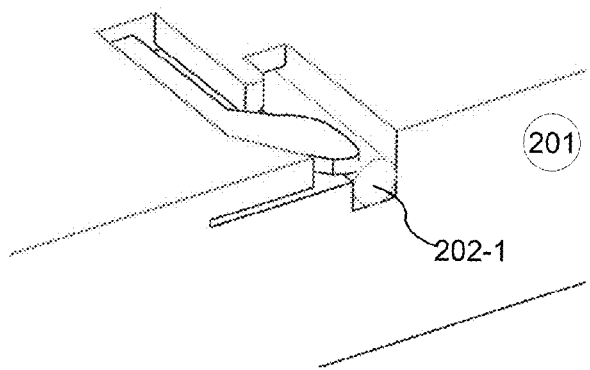

FIG. 6B provides a cut sectional view of a device 201 showing a compressed spring element 231-C engaging one of the fiber optic elements 202-1 by a surface 232. An analogous configuration would exist for a second fiber optic element 202-2 (not shown) in the complete device. FIGS. 6C and 6D provide a cut end view and a perspective view of fiber optic element 202-1 in the sectioned device along with alignment features 211 (bottom surface), 221 (side surface, e.g. an extended side feature having a thickness of one layer in some alternative embodiments), contact surface 232 of compressed spring 231-C. In some implementations a slight compression of the fiber optic element by the spring arm may occur (as shown) while in other embodiments the arm may be configured to hold and align the fiber optic element with minimal or substantially no compression. To minimize fiber distortion the mating surface of the spring contact be configured to have as large a contact area as possible (e.g. a length, a width, and a longitudinal or axial orientation (i.e. along the length of the fiber), and a radial orientation and position that provides maximized contact area between the surface and the fiber, fiber cladding layer, fiber buffer, or fiber jacket). For example the length of the surface may provide a contact length greater than 10 microns, more preferably greater than 20 microns, and even more preferably greater than 50 microns of continuous or discontinuous contact.

Fiber optic alignment methods of the invention may make use of one or more of the devices described herein and may involve one or more of the follow steps: (1) providing a first fiber optic element, (2) providing one or more additional optic elements (e.g. fiber optic elements, sensors, light sources, etc.), (3) providing an alignment device capable of receiving the first fiber optic element and possibly the one or more additional fiber optic elements, (4) inserting the first fiber optic element an alignment orifice and channel of the device, (5) possibly inserting the one or more additional fiber optic elements into one or more additional alignment orifices and channels of the device. In some variations of these embodiments, the steps may additionally include, active movements to engage or disengage spring alignment elements. Some embodiments may further involve the releasing a fiber optic element from an alignment device either passively or actively, either for permanent removal or replacement or for reinsertion. Additional steps may involve the protection of fiber optic tip elements during insertion and/or the cleaning or polishing of element tips after insertion.

As noted above other steps may include the elastic or inelastic bending of device features in the regions of entry ports to aid in loading of fiber optic elements and possibly restoring their original configuration after loading. The various alternatives noted for the first embodiment also apply to the second embodiment, the alignment method embodiments, and fabrication method embodiments. Method embodiments for fabrication of fiber optic devices may make use of the various methods set as shown in FIGS. 1A-4I or the various methods set forth in one or more of the publications, patents, or applications incorporated herein by reference.

The alignment devices of the present invention may be made to handle fiber optic elements (e.g. fibers or cladded fibers) of any size but are particularly useful when these elements are less than 250 microns in diameter, more preferable less than about 130 microns in diameter, more preferably less than 70 microns in diameter and even less than 40 microns in diameter.

Further Comments and Conclusions

While various specific embodiments and some variations have been set forth above, numerous other variations are possible. Some such variations may involve the addition of some steps or operations from one embodiment into another embodiment or the replacement of steps in one embodiment by steps from a different embodiment. In some embodiment variations and implementations, structural materials may be electrodepositable materials such as nickel, nickel-cobalt, nickel manganese, nickel phosphor, silver, rhodium, palladium, gold, and/or palladium while in other embodiments other metals, semiconductor materials, or dielectrics may be used which may or may not be electrodepositable. In some embodiments sacrificial material may include one or more metals, such as copper or tin, or various dielectrics. In some embodiments material deposition may occur by one or more of electroplating, electroless plating, physical vapor deposition, chemical vapor deposition, spreading, spraying, ink jetting, extruding, fling coating, and the like. In some embodiments additional steps may be used to provide enhanced or improved part formation such as for example, cleaning steps, surface activation steps, alloying steps, diffusion bonding steps, heat treating steps, process tracking steps, temperature, or atmosphere control steps, and the like. In some embodiments, material may be supplied in the form of sheets or powders. In some embodiments, different layers may have different thickness, more than two structural materials may be deposited on any given layer or on different layers and/or more than one sacrificial material may be used on any given layer or on different layers.

In some embodiments, tracking of failed parts may occur manually, or automatically (e.g. by computer/program controlled inspection/test hardware, optics, and/or analysis or comparison methods). For example parts on a wafer may be examined under a manual or computer control of an encoder (X and Y) tracked microscope reticle and when bad parts are identified, a position may be read and manually logged or alternatively, a button may be pressed or other command may be issued that causes the current microscope X & Y position to be automatically recorded as part of a list of bad structures or part positions. The recorded positions may be identified with specific parts and then specific cutting or tethering positions identified.

In some embodiment variations, a computer running a program may be used to correlate the defect locations with the affected parts on the build. In some embodiment variations, part modification locations (e.g. cutting or ablation locations) may be targeted using supplied coordinate data only, coordinate data in combination with optical recognition software and a camera that is viewing the build, feedback between positioning movements, commanded modification locations and detected modifications. In some embodiments, the processes set forth herein may be implemented via multiple independent machines (some or all of which may be manually operated or some or all of which may be computer controlled by programs operating on user supplied data and/or information generated by other system components). In some implementations a single multifunction computer controlled apparatus may be used. In some embodiment variations, modifications may take a number of forms including unambiguously marking the good parts or the bad parts, destroying suspected bad parts or otherwise selected parts (e.g. cutting them in half, in thirds, in fourths, etc.), completely ablating or machining them into non-existence, creating obvious damage that will provide clear and unambiguous indications of which parts are bad (e.g. slotting tips, putting holes in parts, removing any mounting or alignment features, etc.).

The patent applications and patents set forth below are hereby incorporated by reference herein as if set forth in full. The teachings in these incorporated applications can be combined with the teachings of set forth directly in these pages and drawings in many ways: For example, enhanced methods of producing structures may be derived from some combinations of teachings, enhanced structures, devices, or components may be obtainable (e.g. from various combinations of structural features of different embodiments or various combinations of materials that give enhanced reliability, that promote easy of assembly, that provide enhanced functionality, or that provide quicker, less expensive, or more automated device fabrication, testing, or the like.

| U.S. patent application No., Filing Date U.S. application Pub No., Pub Date U.S. Pat. No., Pub Date | Inventor, Title |
|---|---|
| 10/830,262 - Apr. 21, 2004 2004-0251142A - Dec. 16, 2004 7,198,704 - Apr. 3, 2007 | Cohen, "Methods of Reducing Interlayer Discontinuities in Electrochemically Fabricated Three-Dimensional Structures" |
| 10/697,597 - Dec. 20, 2002 2004-0146650A - Jul. 29, 2004 | Lockard, "EFAB Methods and Apparatus Including Spray Metal or Powder Coating Processes" |
| 10/607,931 - Jun. 27, 2003 2004-0140862 - Jul. 22, 2004 7,239,219 - Jul. 3, 2007 | Brown, "Miniature RF and Microwave Components and Methods for Fabricating Such Components" |
| 10/841,100 - May 7, 2004 2005-0032362 - Feb. 10, 2005 7,109,118 - Sep. 19, 2006 | Cohen, "Electrochemical Fabrication Methods Including Use of Surface Treatments to Reduce Overplating and/or Planarization During Formation of Multi-layer Three-Dimensional Structures" |
| 10/434,294 - May 7, 2003 2004-0065550A - Apr. 8, 2004 | Zhang, "Electrochemical Fabrication Methods With Enhanced Post Deposition Processing" |
| 10/434,103 - May 7, 2004 2004-0020782A - Feb. 5, 2004 7,160,429 - Jan. 9, 2007 | Cohen, "Electrochemically Fabricated Hermetically Sealed Microstructures and Methods of and Apparatus for Producing Such Structures" |
| 10/841,006 - May 7, 2004 2005-0067292 - May 31, 2005 | Thompson, "Electrochemically Fabricated Structures Having Dielectric or Active Bases and Methods of and Apparatus for Producing Such Structures" |
| 10/841,347 - May 7, 2004 2005-0072681 - Apr. 7, 2005 | Cohen, "Multi-step Release Method for Electrochemically Fabricated Structures" |
| 60/533,947 - Dec. 31, 2003 | Kumar, "Probe Arrays and Method for Making" |
| 11/733,195 - Apr. 9,2007 2008-0050524 - Feb. 28, 2008 | Kumar, "Methods of Forming Three-Dimensional Structures Having Reduced Stress and/or Curvature" |
| 11/506,586 - Aug. 8, 2006 2007-0039828 - Feb. 22, 2007 7,611,616 - Nov. 3, 2009 | Cohen, "Mesoscale and Microscale Device Fabrication Methods Using Split Structures and Alignment Elements" |
| 10/949,744 - Sep. 24, 2004 2005-0126916 - Jun. 16, 2005 7,498,714 - Mar. 3, 2009 | Lockard, Three-Dimensional Structures Having Feature Sizes Smaller Than a Minimum Feature Size and Methods for Fabricating" |
| 13/273,873 - Oct. 14, 2011 2012-0064227 - Mar. 15, 2012 | Chen, "Cantilever Microprobes For Contacting Electronic Components and Methods for Making Such Probes" |
| 12/631,632 - Dec. 4, 2009 2010-0155253 - Jun. 24, 2010 | Kim, "Microprobe Tips and Methods for Making" |
| 12/345,624 - Dec. 29, 2008 8,070,931 - Dec. 6, 2011 | Cohen, "Electrochemical Fabrication Method Including Elastic Joining of Structures" |
| 10/995,609 - Nov. 22, 2004 2005-0202660 - Sep. 15, 2005 | Cohen, "Electrochemical Fabrication Process Including Process Monitoring, Making Corrective Action Decisions, and Taking Appropriate Actions" |
| 11/028,957 - Jan. 3, 2005 2005-0202667 - Sep. 15, 2005 | Cohen, "Electrochemical Fabrication Methods Incorporating Dielectric Materials and/or Using Dielectric Substrates" |
| 11/029,218 - Jan. 3, 2005 2005-0199583 - Sep. 15, 2005 7,524,427 - Apr. 28, 2009 | Cohen, "Electrochemical Fabrication Methods Incorporating Dielectric Materials and/or Using Dielectric Substrates" |
| 12/906,970 - Oct. 18, 2010 2011-0132767 - Jun. 11, 2009 | Wu, "Multi-Layer, Multi-Material Fabrication Methods for Producing Micro-Scale and Millimeter-Scale Devices with Enhanced Electrical or Mechanical Properties" |

Though various portions of this specification have been provided with headers, it is not intended that the headers be used to limit the application of teachings found in one portion of the specification from applying to other portions of the specification. For example, it should be understood that alternatives acknowledged in association with one embodiment, are intended to apply to all embodiments to the extent that the features of the different embodiments make such application functional and do not otherwise contradict or remove all benefits of the adopted embodiment. Various other embodiments of the present invention exist. Some of these embodiments may be based on a combination of the teachings set forth directly herein with various teachings incorporated herein by reference.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

I claim:

1. A fiber optic element alignment device including a plurality of layers of a material comprising:

(i) at least one fiber optic element entry port defined by at least a portion of the plurality of layers;
(ii) at least one fiber optic element insertion channel extending from the at least one fiber optic entry port through at least a portion of the plurality of layers;
(iii) a first side alignment feature, for each insertion channel, running at least part way along a side of the insertion channel;
(iv) an alignment surface, for each insertion channel, selected from the group consisting of a top alignment surface and a bottom alignment surface defining a respective top or bottom of the insertion channel; and
(v) at least one spring element, for each insertion channel, that forces an inserted fiber optic element into an alignment position.

2. The device of claim 1 wherein the spring element force biases an inserted fiber optic element into a position against the first side alignment feature and the alignment surface.

3. The device of claim 1 wherein the spring element force has a component along a stacking direction of the layers and along a direction that perpendicular to the plane of the layers.

4. The device of claim 1, wherein the spring element force is directed perpendicular to a plane of the layers without a substantial component parallel to the plane of the layers.

5. The device of claim 1, wherein the spring element force is directed parallel to a plane of the layers without a substantial component perpendicular to the plane of the layers.

6. The device of claim 1 comprising a plurality of entry ports for receiving a plurality of fiber optic elements.

7. The device of claim 1 wherein a plurality of spring alignment elements are configured to act on a fiber optic element when inserted into a given insertion channel.

8. The device of claim 7 wherein the plurality of springs comprises multiple springs located in series along the given insertion channel.

9. The device of claim 1 wherein the first side alignment feature is defined by a configuration of a single one of the plurality of layers.

10. The device of claim 1 wherein each of the at least one spring element is selected from the group consisting of (1) a single cantilever for a given channel, (2) multiple cantilevers for a given channel, (2) at least one compliant bridging structure anchored at two points with one on either side of a fiber optic element contact region.

11. The device of claim 1 wherein the at least one spring element is monolithic with respect to the channel.

12. The device of claim 1 wherein the at least one spring element has a shaped tip that encounters the fiber at an angle such that force is gradually applied to the fiber as the fiber is inserted.

13. The device of claim 1 wherein the at least one spring element is capable of being moved to a low force loading or unloading position and then moved back to a retention or alignment position.

14. The device of claim 13 wherein the device additionally comprises features that engage the fiber optic element and inhibit removal of the fiber optic element once inserted unless a retention device is moved to a loading or unloading position.

15. The device of claim 1 is further configured with sufficient entry ports to and channels to receive and align at least four fiber optic elements.

16. The device of claim 1 is further configured with functionally connected entry ports and channels such that at least two fiber optics elements may be inserted and aligned to optically engage one another.

17. A fiber optic alignment procedure comprising:
(a) providing at least one fiber optic element;
(b) providing a fiber optic alignment device, comprising:
(i) at least one fiber optic element entry port defined by at least a portion of the plurality of layers;
(ii) at least one fiber optic element insertion channel extending from the at least one fiber optic entry port through at least a portion of the plurality of layers;
(iii) a first side alignment feature, for each insertion channel, running at least part way along a side of the insertion channel;
(iv) an alignment surface, for each insertion channel, selected from the group consisting of a top alignment surface and a bottom alignment surface defining a respective top or bottom of the insertion channel; and
(v) at least one spring element, for each insertion channel, that forces an inserted fiber optic element into an alignment position;
(c) inserting at least one fiber optic element into the at least one entry port and at least one channel of the fiber optic alignment device; and
(d) fully engaging the at least one spring element to align the at least one fiber optic element.

18. The device of claim 17 is further configured with sufficient entry ports to and channels to receive and align at least four fiber optic elements.

19. The device of claim 17 is further configured with functionally connected entry ports and channels such that at least two fiber optics elements may be inserted and aligned to optically engage one another.

\* \* \* \* \*